(12) United States Patent
Goubard et al.

(10) Patent No.: US 9,976,066 B2
(45) Date of Patent: *May 22, 2018

(54) SELF-ADHESIVE ARTICLE WITH FOAM SUPPORT

(71) Applicant: BOSTIK SA, La Plaine Saint Denis (FR)

(72) Inventors: David Goubard, Compiegne (FR); Olivier Laferte, Trosly Breuil (FR); Herveline Troadec, Compiegne (FR)

(73) Assignee: BOSTIK SA, La Plaine Saint Denis (FR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/348,739

(22) Filed: Nov. 10, 2016

(65) Prior Publication Data

US 2017/0058166 A1 Mar. 2, 2017

Related U.S. Application Data

(62) Division of application No. 14/580,699, filed on Dec. 23, 2014, now Pat. No. 9,493,690.

(30) Foreign Application Priority Data

Dec. 30, 2013 (FR) ..................... 13 63674

(51) Int. Cl.
| | | |
|---|---|---|
| *C09J 175/08* | (2006.01) | |
| *C09J 7/02* | (2006.01) | |
| *C09J 175/04* | (2006.01) | |
| *C09J 201/06* | (2006.01) | |
| *C08G 18/48* | (2006.01) | |
| *C08G 18/75* | (2006.01) | |
| *C08G 18/10* | (2006.01) | |
| *C08G 18/28* | (2006.01) | |
| *C08G 18/22* | (2006.01) | |
| *C08G 18/50* | (2006.01) | |

(52) U.S. Cl.
CPC ............ *C09J 175/08* (2013.01); *C08G 18/10* (2013.01); *C08G 18/227* (2013.01); *C08G 18/289* (2013.01); *C08G 18/4825* (2013.01); *C08G 18/5096* (2013.01); *C08G 18/755* (2013.01); *C09J 7/0246* (2013.01); *C09J 7/0289* (2013.01); *C09J 175/04* (2013.01); *C09J 201/06* (2013.01); *C08G 18/4829* (2013.01); *C09J 2201/122* (2013.01); *C09J 2201/16* (2013.01); *C09J 2201/606* (2013.01); *C09J 2201/622* (2013.01); *C09J 2400/243* (2013.01); *C09J 2475/00* (2013.01); *C09J 2483/00* (2013.01); *Y10T 428/2896* (2015.01)

(58) Field of Classification Search
CPC ...... C09J 183/01; C09J 7/0289; C09J 7/0246; C09J 2201/122; C09J 2201/606; C09J 2483/00; C09J 175/08; C09J 175/04; C08G 18/10; C08G 18/227; C08G 18/289; C08G 18/4829; C08G 18/755
See application file for complete search history.

(56) References Cited

U.S. PATENT DOCUMENTS

| | | |
|---|---|---|
| 8,691,909 B2 | 4/2014 | Laferte et al. |
| 2011/0151253 A1 | 6/2011 | Laferte et al. |
| 2013/0299074 A1 | 11/2013 | Chartrel et al. |

FOREIGN PATENT DOCUMENTS

| | | |
|---|---|---|
| EP | 2336208 A1 | 6/2011 |
| WO | 2012090151 A2 | 7/2012 |
| WO | 2013136108 A1 | 9/2013 |

OTHER PUBLICATIONS

Search Report dated Sep. 19, 2014, issued in corresponding FR 1363674 application (p. 1).
Pebax 2533 Data Sheet. 2013. http://www.pebax.com/export/sites/pebax/.content/medias/downloads/literature/tds-pebax-2533sa01.pdf.

*Primary Examiner* — Michael L Leonard
(74) *Attorney, Agent, or Firm* — Millen, White, Zelano and Branigan, P.C.

(57) ABSTRACT

The present invention relates to a self-adhesive article comprising a support layer of foam or similar type and an adhesive layer obtained by cross-linking an adhesive composition. The present invention also relates to a mixture of at least two polymers suitable for use for the manufacture of the self-adhesive article as well as an adhesive composition comprising said mixture of at least two polymers according to the invention.

6 Claims, No Drawings

SELF-ADHESIVE ARTICLE WITH FOAM SUPPORT

TECHNICAL FIELD

The present invention relates to a self-adhesive article comprising a support layer of foam or similar type and an adhesive layer obtained by cross-linking an adhesive composition. The present invention also relates to a mixture of at least two polymers suitable for use for the manufacture of the self-adhesive article as well as an adhesive composition comprising said mixture of at least two polymers according to the invention.

STATE OF THE ART

Pressure-sensitive adhesives (also called self-adhesives or PSAs) are substances that give the support layer, also called a substrate, coated therewith an immediate tackiness or adhesivity (often called "tack") at room temperature, which allows its instantaneous adhesion to a substrate under the effect of brief slight pressure. PSAs are widely used for the manufacture of self-adhesive labels or films which are fastened to articles for the purpose of presenting information (such as a barcode, name, price) and/or for decorative purposes, whether temporarily or permanently affixed by adhesive. PSAs are also used for the manufacture of self-adhesive tapes for various uses. Mention may be made, for example, besides the transparent adhesive tape widely used in daily life, of: the forming and assembling of cardboard packaging; the protection of surfaces for painting works, fixing and holding various items such as panels, bricks, projecting objects, in the construction of buildings or structures; fixing and holding metal, plastic or glass parts, whether flat or having a specific profile, such as electrical cables, plastic films, window panes, sheets, inscriptions, logos, parts of seats, instrument panels, plastic or textile walls, pipes or tubes for conveying fluids, in particular in the transport industry, the bonding of carpets by double-sided adhesive tapes.

With a view to the manufacture of self-adhesive labels and/or tapes, PSAs are often applied by continuous coating processes to the entire surface of a (where appropriate printable) support layer of large dimensions, in a quantity (generally expressed in g/m$^2$) denoted hereinbelow by the term "weight per unit area". The support layer is constituted by paper or film or sheet or plate of polymer material having one or more layers. The adhesive layer that covers the support layer may itself be covered with a protective non-stick layer (often called a "release liner"), for example composed of a siliconized film. The multilayer system obtained is generally packaged by being wound up in the form of large rolls that can reach up to 2 m in width and at least 1 m in diameter, which can be stored and transported.

These multilayer systems can subsequently be converted into self-adhesive labels that can be applied by the end user, by means of conversion processes which include printing the desired informative and/or decorative elements on the printable face of the support layer, then cutting them to the desired shape and dimensions. The release liner can easily be removed without modification of the adhesive layer which remains fixed on the support layer. After separation from its release liner, the label is applied to the article to which it is to be affixed, either manually or using labellers on automated packing lines.

These multilayer systems can also be converted into self-adhesive tapes by cutting and packing in rolls of determined width and length.

Owing to their high tack at ambient temperature, PSAs allow a rapid hold or attachment of the self-adhesive tape and/or label onto the substrate (or article) to which it is to be affixed (for example, in the case of labels, on bottles or, in the case of tapes, on cardboard boxes to be formed), suitable for reaching high industrial production speeds.

There is a field of application of PSAs for which it is desirable that the tack of the labels and/or tapes on the substrate is still maintained when the adhesive joint providing the attachment is exposed to a temperature that may vary over a wide range (as well as, therefore, the article to which the label and/or the tape is affixed). By way of example there may be mentioned the placing of labels on certain components of automobiles (or other vehicles) situated close to the engine, or on containers designed to receive a hot liquid during their packaging, or even on articles (such as tyres) which are hot-labelled when leaving the production lines. There may also be mentioned the use of self-adhesive tapes for assembling parts for which a good thermal resistance is necessary as in the case, for example, of the interior trim of aircraft or other vehicles.

It can also be useful to assemble surfaces which are not strictly parallel, or to bond a self-adhesive article onto a surface which is not smooth, for example a surface having irregularities. A support layer known as "conformable" makes it possible to gum the surface irregularities but also to bond two surfaces that are not strictly parallel to each other, for example by absorbing the differences in thickness, as the deformations originating from affixing the self-adhesive article or the use of the adhesive joint made in this way, the curved surfaces or complex surfaces require a joint that is as adhesive as possible, withstanding vibrations. When constituted, the joint can also act as a total, partial or temporary barrier to fluids that are more or less abundant and frequent.

Self-adhesive articles comprising this type of support known as "conformable" can be used in many fields of application, such as:
  automobile: for affixing logos, lettering, internal soundproofing, interior trim, stickers in the passenger compartment;
  construction: for sound and thermal insulation, assembling windows;
  industry: for assembly (assembling-fixing), for fixing photopolymer sheets for example, used by printers;
  furniture: for fixing mirrors for example;
  electronics, for fixing or superimposition of the different constituent elements of the control or interface elements.

International application WO 2011/082094 describes a self-adhesive article comprising a support layer in the form of a foam and an adhesive composition based on polyacrylate modified by silylated functions. The polymers used in this document are solvent-phase polymers. This document does not describe the adhesive composition used for the manufacture of the self-adhesive article according to the invention.

U.S. Pat. No. 6,231,962 describes a self-adhesive article comprising a support layer in the form of a foam and an adhesive composition chosen from olefins, siliconized adhesives, adhesives based on natural rubber, adhesives based on synthetic rubber and other elastomer-based adhesives. The adhesive compositions described in this document have problems of high-temperature resistance and therefore do not have a satisfactory shear resistance. This document does not describe the adhesive composition used for the manufacture of the self-adhesive article according to the invention.

Application WO 2009/106699 describes a self-adhesive article comprising an adhesive layer obtained from a polyurethane. Application EP 2336208 describes a self-adhesive article comprising an adhesive layer obtained from a polyether. These two applications describe self-adhesive articles utilizing rigid supports of the polyethylene terephthalate (PET) type.

These two applications describe neither self-adhesive articles comprising a support as claimed, nor the particular mixture of at least two polymers as claimed.

The conformable supports are stretchable and generally have a low density. As a result, this type of support is deformable and can easily break. In particular, a foam has an alveolar structure, for example an air-filled structure with fine membranes, which consequently can easily break.

Not all the adhesive compositions which allow the manufacture of a self-adhesive article comprising a support of the PET type allow the manufacture of a self-adhesive article comprising a conformable support and having satisfactory properties for the applications in question, such as a high shear resistance and a high break temperature of the adhesive joint.

SUMMARY OF THE INVENTION

A first subject of the present invention relates to a self-adhesive article comprising a support layer coated with an adhesive layer, said support layer having an elongation at break ranging from 50 to 1200% and a bulk density ranging from 25 to 1200 kg/m$^3$, said adhesive layer is obtained by cross-linking an adhesive composition comprising:

a) at least one polymer of formula (Ia) or at least one polymer of formula (IIa) or a mixture of at least two polymers chosen from polyurethanes and polyethers with one, two or three terminal groups of mono-, di- or tri-alkoxysilane type, said mixture comprising at least one polymer corresponding to one of formulae (Ia), (IIa), (IIIa) and (IVa), it being understood that when a polymer with two or three terminal groups of monoalkoxysilane type is present, said mixture comprises up to 15% by weight, with respect to the total weight of the mixture, of said polymer, when a polymer with one terminal group of mono-, di- or tri-alkoxysilane type is present, said mixture comprises up to 15% by weight, with respect to the total weight of the mixture, of said polymer, b) at least one tackifier resin, and c) at least one cross-linking catalyst;

in which the polymer of formula (Ia) is a polyurethane or a polyether comprising two or three hydrolyzable terminal groups of trialkoxysilane type, with a quantity of silyl functions less than or equal to 0.480 meq/g of polymer and corresponding to the following formula:

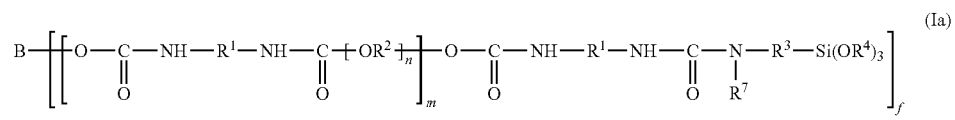

the polymer of formula (IIa) is a polyurethane or a polyether comprising two or three hydrolyzable terminal groups of dialkoxysilane type, with a quantity of silyl functions less than or equal to 0.480 meq/g of polymer and corresponding to the following formula:

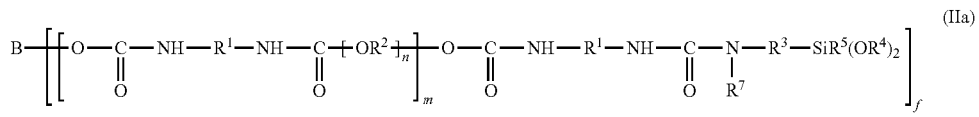

the polymer of formula (IIIa) is a polyurethane or a polyether comprising two or three hydrolyzable terminal groups of monoalkoxysilane type, with a quantity of silyl functions less than or equal to 0.480 meq/g of polymer and corresponding to the following formula:

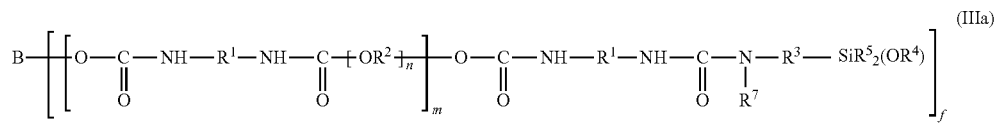

the polymer of formula (IVa) is a polyurethane or a polyether comprising one hydrolyzable terminal group of mono-, di- and/or trialkoxysilane type, with a quantity of silyl functions less than or equal to 0.480 meq/g of polymer and corresponding to the following formula:

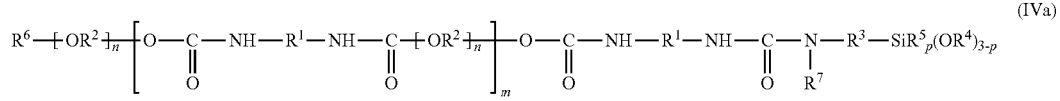
(IVa)

in formulae (Ia), (IIa), (IIIa) and (IVa) above,

B represents one of the two formulae below:

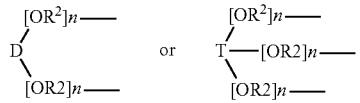

where D and T represent a hydrocarbon radical comprising 2 to 66 carbon atoms, linear, branched, cyclic, alicyclic or aromatic, saturated or unsaturated, optionally comprising one or more heteroatoms, $R^1$ represents a divalent hydrocarbon radical comprising 5 to 15 carbon atoms which can be aromatic or aliphatic, linear, branched or cyclic, $R^3$ represents a linear or branched divalent alkylene radical comprising 1 to 6 carbon atoms, $R^2$ represents a linear or branched divalent alkylene radical comprising 2 to 4 carbon atoms, $R^4$ and $R^5$, identical or different, each represent a linear or branched alkyl radical comprising 1 to 4 carbon atoms, $R^4$ optionally being able to be part of a ring, $R^6$ represents a hydrocarbon radical comprising 1 to 22 carbon atoms, linear, branched, cyclic, alicyclic or aromatic, saturated or unsaturated, optionally comprising one or more heteroatoms, $R^7$ represents a hydrogen atom, a phenyl radical or a linear, branched or cyclic alkyl radical comprising 1 to 10 carbon atoms, n is an integer such that the average molar mass of the polyether block of formula —$[OR^2]_n$— ranges from 300 g/mol to 40000 g/mol, m is an integer such that the average molar mass of the polymer ranges from 600 g/mol to 100000 g/mol, p is an integer equal to 0, 1 or 2.

f is an integer equal to 2 or 3.

According to an embodiment, the mixture of at least two polymers comprises:

at least one polymer corresponding to one of formulae (Ia), (IIa), (IIIa) or (IVa) described above, and at least one polymer corresponding to one of formulae (I), (II), (III) or (IV) below:

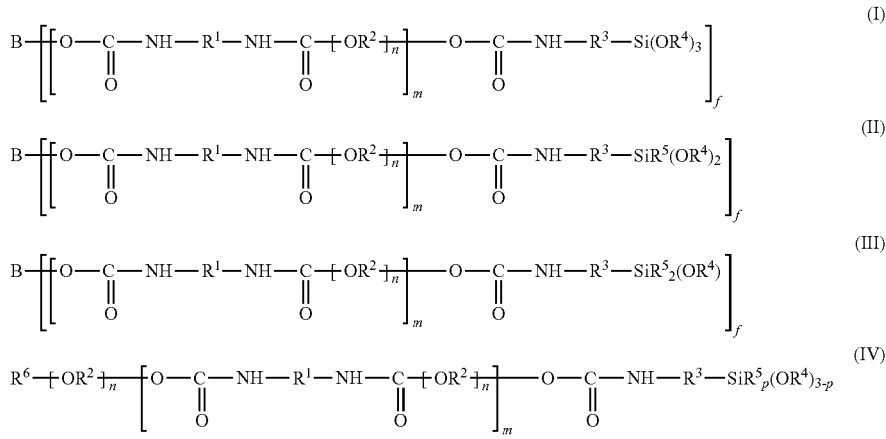

it being understood that:

when a polymer of formula (IIIa) and/or (III) is present, said mixture comprises up to 15% by weight of polymer of formula (IIIa) and/or (III), with respect to the total weight of the mixture of polymers, when a polymer of formula (IVa) and/or (IV) is present, said mixture comprises up to 15% by weight of polymer of formula (IVa) and/or (IV), with respect to the total weight of the mixture of polymers;

in formulae (II), (IIa), (III), and (IV) above:

B represents one of the two formulae below:

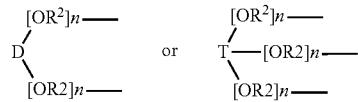

where D and T represent a hydrocarbon radical comprising 2 to 66 carbon atoms, linear, branched, cyclic, alicyclic or aromatic, saturated or unsaturated, optionally comprising one or more heteroatoms, $R^1$ represents a divalent hydrocarbon radical comprising 5 to 15 carbon atoms which can be aromatic or aliphatic, linear, branched or cyclic, $R^3$ represents a linear or branched divalent alkylene radical comprising 1 to 6 carbon atoms, $R^2$ represents a linear or branched divalent alkylene radical comprising 2 to 4 carbon atoms, $R^4$ and $R^5$, identical or different, each represent a linear or branched alkyl radical comprising 1 to 4 carbon atoms, $R^4$ optionally being able to be part of a ring, $R^6$ represents a hydrocarbon radical comprising 1 to 22 carbon atoms, linear, branched, cyclic, alicyclic or aromatic, saturated or unsaturated, optionally comprising one or more heteroatoms, n is an integer such that the average molar mass of the polyether block of formula —[$OR^2$]$_n$— ranges from 300 g/mol to 40000 g/mol, m is an integer such that the average molar mass of the polymer ranges from 600 g/mol to 100000 g/mol, p is an integer equal to 0, 1 or 2.

f is an integer equal to 2 or 3.

Preferably, the support layer has a Young's modulus less than or equal to 300 MPa.

According to an embodiment of the invention, the support layer is in the form of a foam.

According to an embodiment of the invention, the support layer has the form of one or more polymeric layers.

Preferably, the adhesive composition comprises:
from 20 to 85% by weight, with respect to the total weight of the adhesive composition, of at least one polymer or a mixture of polymers such as defined in the invention,
from 15 to 80% by weight, with respect to the total weight of the adhesive composition, of at least one tackifier resin,
from 0.01 to 3% by weight, with respect to the total weight of the adhesive composition, of at least one cross-linking catalyst.

Preferably, the tackifier resin has a number-average molar mass ranging from 100 Da to 5 kDa and is chosen from:
(i) resins able to be obtained by polymerization of terpene hydrocarbons and phenols, in the presence of Friedel-Crafts catalysts,
(ii) resins able to be obtained by polymerization of alpha-methyl styrene, (i) rosins of natural or modified origin;
(iv) resins obtained by hydrogenation, polymerization or copolymerization from mixtures of unsaturated aliphatic hydrocarbons having approximately 5, 9 or 10 carbon atoms, originating from petroleum cuts,
(v) terpene resins generally resulting from the polymerisation of terpene hydrocarbons in the presence of Friedel-Crafts catalysts,
(vi) copolymers based on natural terpenes, and
(vii) acrylic resins.

Another subject of the present invention relates to a mixture of polymers suitable for use in the adhesive composition as defined above, said mixture comprising at least two polymers belonging to 2 different groups chosen from groups P1, P2, P3 and P4, said mixture comprising at least one polymer corresponding to one of formulae (Ia), (IIa), (IIIa) and (IVa) and with a quantity of silyl functions less than or equal to 0.480 meq/g of polymer, it being understood that:
when a polymer of group P3 is present, the mixture comprises up to 15% by weight, with respect to the total weight of the mixture, of at least one polyurethane or at least one polyether of group P3;
when a polymer of group P4 is present, the mixture comprises up to 15% by weight, with respect to the total weight of the mixture of polymers, of at least one polyurethane or at least one polyether of group P4;

P1 being a group constituted by polyurethanes and polyethers with two or three terminal groups of trialkoxysilane type;

P2 being a group constituted by polyurethanes and polyethers with two or three terminal groups of dialkoxysilane type P3 being a group constituted by polyurethanes and polyethers with two or three terminal groups of monoalkoxysilane type;

P4 being a group constituted by polyurethanes and polyethers with one terminal group of mono-, di- or trialkoxysilane type.

According to an embodiment of the invention, the mixture of polymers comprises:
up to 95% by weight, with respect to the total weight of the mixture, of at least one polymer corresponding to formula (Ia), and
at least one polymer corresponding to formula (IIa) as described in claim 1.

According to an embodiment of the invention, the mixture of polymers comprises:
from 10 to 85% by weight of at least one polymer corresponding to formula (Ia), and
from 15 to 90% by weight of at least one polymer corresponding to formula (IIa),
with respect to the total weight of the mixture, of at least two polymers.

According to an embodiment of the invention, the mixture of polymers comprises:
up to 15% by weight, with respect to the total weight of the mixture, of at least one polymer corresponding to formula (IIIa), and
at least one polymer corresponding to formula (IIa) as described in claim 1.

According to an embodiment of the invention, the mixture of polymers comprises:
from 5 to 95% by weight of at least one polymer corresponding to formula (Ia), and
from 5 to 15% by weight of at least one polymer corresponding to formula (IIIa),
with respect to the total weight of said mixture.

According to an embodiment of the invention, the mixture of polymers comprises:
at least one polymer corresponding to one of formulae (Ia), (IIa), (IIIa) or (IVa) described above, and
at least one polymer corresponding to one of formulae (I), (II), (III) or (IV) described above.

The present invention also relates to an adhesive composition suitable for use for the manufacture of the self-adhesive article according to the invention, comprising:
the mixture of polymers according to the invention,
at least one tackifier resin, and
at least one cross-linking catalyst.

Preferably, the adhesive composition according to the invention comprises:
from 20 to 85% by weight, with respect to the total weight of the adhesive composition, of said mixture of polymers, from 15 to 80% by weight, with respect to the total weight of the adhesive composition, of at least one tackifier resin, from 0.01 to 3% by weight, with respect to the total weight of the adhesive composition, of at least one cross-linking catalyst.

The advantages of the present invention are the following:

the self-adhesive article according to the invention has excellent adhesive strength and tack properties;

the self-adhesive article according to the invention has a high shear resistance;

the self-adhesive article according to the invention is such that the adhesive joint resulting from its attachment on a substrate maintains the required cohesion over a large temperature range;

the self-adhesive article according to the invention can be applied to many surfaces, such as concrete, plastic or metal materials, automobile bodywork and painted materials;

the support layer present in the self-adhesive article according to the invention makes it possible to bond the self-adhesive article onto all types of surface, in particular surfaces with irregularities;

the self-adhesive article according to the invention makes it possible to gum the surface irregularities, despite the fact that the two surfaces to be bonded are not parallel;

the self-adhesive article according to the invention can be applied onto complex, curved surfaces;

the self-adhesive article according to the invention ensures a good thermal and sound insulation due to the properties of the support layer, in particular due to the support layer in the form of a foam.

DETAILED DESCRIPTION OF THE INVENTION

Self-Adhesive Article

The present invention relates to a self-adhesive article comprising a support layer coated with an adhesive layer, said support layer having an elongation at break ranging from 50 to 1200% and a bulk density ranging from 25 to 1200 kg/m$^3$, said adhesive layer is obtained by cross-linking an adhesive composition comprising:

a) at least one polymer of formula (Ia) or at least one polymer of formula (IIa) or a mixture of at least two polymers chosen from polyurethanes and polyethers with one, two or three terminal groups of mono-, di- or tri-alkoxysilane type, said mixture comprising at least one polymer corresponding to one of formulae (Ia), (IIa), (IIIa) and (IVa), it being understood that when a polymer with two or three terminal groups of monoalkoxysilane type is present, said mixture comprises up to 15% by weight, with respect to the total weight of the mixture, of said polymer, when a polymer with one terminal group of mono-, di- or tri-alkoxysilane type is present, said mixture comprises up to 15% by weight, with respect to the total weight of the mixture, of said polymer, b) at least one tackifier resin, and c) at least one cross-linking catalyst.

The polymer of formula (Ia) is a polyurethane or a polyether comprising two or three hydrolyzable terminal groups of trialkoxysilane type, with a quantity of silyl functions less than or equal to 0.480 meq/g of polymer and corresponding to the following formula:

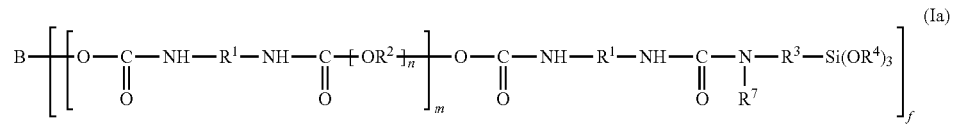

The polymer of formula (IIa) is a polyurethane or a polyether comprising two or three hydrolyzable terminal groups of dialkoxysilane type, with a quantity of silyl functions less than or equal to 0.480 meq/g of polymer and corresponding to the following formula:

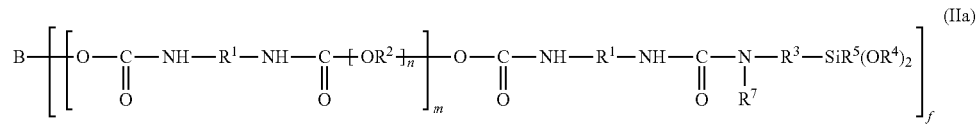

The polymer of formula (IIIa) is a polyurethane or a polyether comprising two or three hydrolyzable terminal groups of monoalkoxysilane type, with a quantity of silyl functions less than or equal to 0.480 meq/g of polymer and corresponding to the following formula:

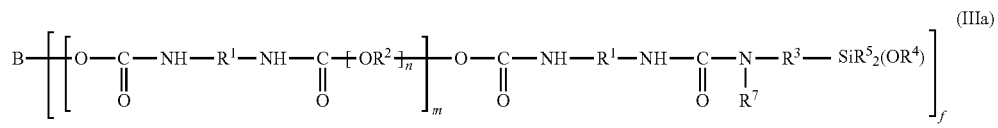

The polymer of formula (IVa) is a polyurethane or a polyether comprising one terminal group of type mono-, di- and/or hydrolyzable trialkoxysilane, with a quantity of silyl functions less than or equal to 0.480 meq/g of polymer and corresponding to the following formula:

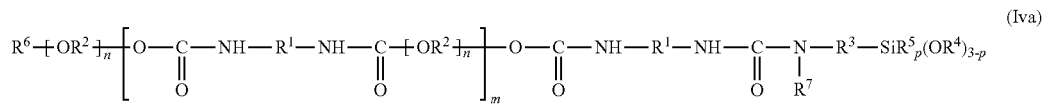

in formulae (Ia), (IIa), (IIIa) and (IVa) above,
B represents one of the two formulae below:

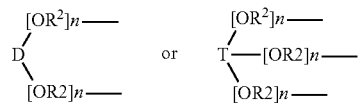

where D and T represent a hydrocarbon radical comprising 2 to 66 carbon atoms, linear, branched, cyclic, alicyclic or aromatic, saturated or unsaturated, optionally comprising one or more heteroatoms, $R^1$ represents a divalent hydrocarbon radical comprising 5 to 15 carbon atoms which can be aromatic or aliphatic, linear, branched or cyclic, $R^3$ represents a linear or branched divalent alkylene radical comprising 1 to 6 carbon atoms, $R^2$ represents a linear or branched divalent alkylene radical comprising 2 to 4 carbon atoms, $R^4$ and $R^5$, identical or different, each represent a linear or branched alkyl radical comprising 1 to 4 carbon atoms, $R^4$ optionally being part of to be part of a ring, $R^6$ represents a hydrocarbon radical comprising 1 to 22 carbon atoms, linear, branched, cyclic, alicyclic or aromatic, saturated or unsaturated, optionally comprising one or more heteroatoms, $R^7$ represents a hydrogen atom, a phenyl radical or a linear, branched or cyclic alkyl radical comprising 1 to 10 carbon atoms, n is an integer such that the average molar mass of the polyether block of formula $—[OR^2]_n—$ ranges from 300 g/mol to 40000 g/mol, m is an integer such that the average molar mass of the polymer ranges from 600 g/mol to 100000 g/mol, p is an integer equal to 0, 1 or 2.

f is an integer equal to 2 or 3.

In the case where the adhesive composition comprises at least two polymers of different formulae, each parameter defined above B, $R^1$, $R^2$, $R^3$, $R^4$, $R^5$, $R^6$, n, m, p and f can be chosen independently in each of the formulae, i.e. they are identical or different in each of the polymers.

By way of example, B can have the following structure (in this example f will be equal to 2):

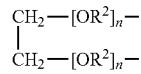

or the following structure (in this example f will then be equal to 3):

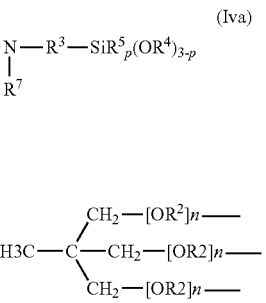

By way of example, $R^6$ can be a methyl radical.

Preferably, $R^1$ is chosen from one of the following divalent radicals, the formulae of which below reveal the 2 free valencies:

a) the divalent radical derived from isophorone:

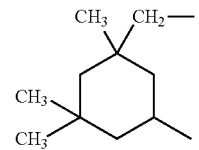

b)

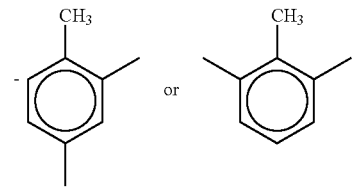

c)

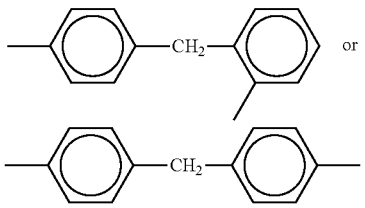

d)

e) —$(CH_2)_6$— (or hexamethylene radical).

Support Layer

The support layer has an elongation at break ranging from 50% to 1200%, preferably ranging from 100% to 1000%, even more preferably from 200% to 700%, and a bulk density ranging from 25 to 1200 kg/m³, preferably ranging from 25 to 1000 kg/m³, even more preferably from 25 to 900 kg/m³, even more preferably from 32 to 800 kg/m³, even more preferably from 50 to 600 kg/m³, even more preferably from 60 to 400 kg/m³.

The elongation at break can be measured according to standard ISO 1926 at 23° C., lengthwise or widthwise. Preferably, the elongation is measured lengthwise.

The bulk density can be measured according to standard ISO 845.

Fillers can be added during the manufacture of the support layer in order to obtain a support layer with a bulk density greater than or equal to 1000 kg/m³. A person skilled in the art knows how to increase the bulk density of a material while maintaining the desired properties of elongation at break.

Preferably, the support layer has a Young's modulus lower than or equal to 300 MPa, preferably ranging from 2 to 100 MPa, even more preferably ranging from 5 to 50 MPa, more particularly ranging from 5 to 35 Mpa.

Preferably, the support layer has a thickness ranging from 0.01 to 50 mm, even more preferably ranging from 0.01 to 20.00 mm, preferably ranging from 0.05 to 10.00 mm, even more preferably ranging from 0.05 to 1.00 mm, advantageously ranging from 0.10 to 0.75 mm.

Preferably, the support layer is in the form of a foam.

Within the meaning of the present invention, a foam is a polymeric material comprising gas-filled cells. The foam can have open or closed cells, the structure of the foam depending on the process of expansion of the foam.

Preferably, the outer surface of the support layer in contact with the adhesive composition is closed, i.e. the cells present at the surface in contact with the adhesive composition are all closed cells.

Preferably, the whole of the support layer is a closed-cell foam.

According to a first embodiment, the support layer is made from a material chosen from:
  polyolefins, such as polyethylene, including high-density polyethylene, low-density polyethylene, linear low-density polyethylene and linear ultra-low density polyethylene, polypropylene and polybutylenes,
  polystyrene,
  natural or synthetic rubber,
  vinyl copolymers, such as plasticized or unplasticized polyvinyl chloride, and polyvinyl acetates,
  olefin copolymers, such as ethylene-methacrylate copolymers, ethylene/vinyl acetate copolymers, acrylonitrile/butadiene/styrene copolymers, and ethylene/propylene copolymers,
  polymers and acrylic copolymers,
  polyurethanes,
  polyethers,
  polyesters, and
  mixtures thereof.

Preferably, the support layer comprises a mixture of elastomer and/or plastic materials, such as polypropylene/polyethylene, polyurethane/polyolefins, polyurethane/polycarbonate, polyurethane/polyester.

Preferably, the support layer is in the form of one or more layers of polymer foam, preferably in the form of a polyolefin foam.

Among the foams which can be used for forming the support layer of the self-adhesive article according to the invention, there may be mentioned:
  TL SRZ® 1200.8 foam (available from Alveo) having an elongation at break of 408.8±53% at 23° C., a bulk density of approximately 96.62 kg/m³, a thickness of approximately 0.67 mm and a Young's modulus of 11.2±0.5 MPa;
  TEE® 0400.2 foam (available from Alveo) having an elongation at break of 362.5±85% at 23° C., a bulk density of approximately 293 kg/m³, a thickness of approximately 0.17 mm and a Young's modulus of 18.3±0.6 MPa;
  TMA SRZ® 0500.8 foam (available from Alveo) having an elongation at break of 717.5±117% at 23° C., a bulk density of approximately 196.31 kg/m³, a thickness of approximately 0.72 mm and a Young's modulus of 6.7±0.8 MPa; and
  TL SRZ® 0700.8 foam (available from Alveo) having an elongation at break of 635.4±76% at 23° C., a bulk density of approximately 148.15 kg/m³, a thickness of approximately 0.76 mm and a Young's modulus of 12.9±0.8 MPa.

According to an embodiment, the support layer is a syntactic foam. The technology of syntactic foams is described for example in the publication by Klempner et al., *Polymeric Foam Technology*, second edition, Hanser (2004), page 479.

The adhesive composition is applied onto the support for the manufacture of a self-adhesive article.

The support layer can be covered on one of its two faces, the back face which is not coated with the adhesive layer, by a release liner, for example by a siliconized film. In this way, the self-adhesive article can be rolled up on itself and then unrolled without any problems due to the lack of adhesion of the adhesive layer to the siliconized face.

The support layer according to the invention can also be treated with all types of surface treatment, such as a corona treatment making it possible in particular to increase the wettability.

Adhesive Composition

The adhesive layer is obtained by cross-linking the adhesive composition.

As indicated above, the support layer can also be obtained by expansion of a matrix comprising the adhesive composition according to the invention, in order to obtain a foam known as a syntactic foam.

The adhesive composition used in the self-adhesive article of the invention comprises:
  a) a polymer or a mixture of polymers as described below for the self-adhesive article,
  b) at least one tackifier resin,
  c) at least one cross-linking catalyst.

According to an embodiment, the adhesive composition used in the self-adhesive article of the invention consists essentially of:
  a) a polymer or a mixture of polymers as described below for the self-adhesive article,
  b) at least one tackifier resin, and
  c) at least one cross-linking catalyst.

The polymer can be a polymer of formula (Ia) or a polymer of formula (IIa).

The mixture of at least two polymers present in the adhesive composition used for the manufacture of the self-adhesive article comprises at least two different polymers chosen from the polyurethanes and polyethers with one, two or three terminal groups of mono-, di- or tri-alkoxysilane type, said mixture comprising at least one polymer of formula (Ia), (IIa), (IIIa) or (IVa).

When a when a polymer with two or three terminal groups of monoalkoxysilane type is present in the mixture of at least two polymers, said mixture comprises up to 15% by weight of said polymer, with respect to the total weight of the mixture.

When a polymer with one terminal group of mono-, di- or tri-alkoxysilane type is present in the mixture of at least two polymers, said mixture comprises up to 15% by weight of said polymer, with respect to the total weight of the mixture.

The quantity of silyl functions is given by the suppliers or can be determined by analysis (NMR) or, it can be determined as a function of the content (% by weight) and the nature (chemical structure and molar mass) of the aminosilanes used for the synthesis of the polymers (Ia), (IIa), (IIIa) and (IVa).

The polymers corresponding to one of formulae (Ia), (IIa), (IIIa) and (IVa) can be obtained according to a process as described in the experimental part of the present invention with optionally a total or partial substitution of the polyether diols by polyether monols in the polymers (IVa).

Preferably, the polymer or the mixture of polymers used for the manufacture of the self-adhesive article according to the invention has a number-average molar mass ranging from 600 to 100000 g/mol, even more preferably from 1000 to 50000 g/mol, even more preferably from 2000 to 20000 g/mol.

The number-average molar mass (Mn) expressed in g/mol is calculated from the quantity of silyl functions (E(s)) expressed in meq/g and the functionality F of the polymer.

The functionality F is equal to 2 or 3 for the polymers of formula (Ia), (IIa) and (IIIa).

The functionality F is equal to 1 for the polymers of formula (IVa).

The number-average molar mass is calculated as follows:

$$Mn = \frac{F \times 1000}{E(s)}$$

Among the polymers according to the invention corresponding to formula (Ia), there may be mentioned the polymers Ex19 and Ex20 described in the experimental part.

Among the polymers according to the invention corresponding to formula (IIa), there may be mentioned the polymer Ex8 and the polymer Ex6-18 described in the experimental part.

Among the polymers according to the invention corresponding to formula (IIIa), there may be mentioned the polymer Ex15 described in the experimental part.

Preferably, all the polymers of the mixture of polymers which are able to be used for the manufacture of the self-adhesive article according to the invention have a quantity of silyl functions less than or equal to 0.480 meq/g of polymer, preferably less than or equal to 0.450 meq/g.

According to an embodiment, the mixture of at least two polymers comprises at least two polymers chosen from the polymers of formula (Ia), (IIa), (IIIa) and (IVa).

According to another embodiment, the mixture of at least two polymers comprises at least a polyurethane or a polyether with one, two or three terminal groups of mono-, di- or tri-alkoxysilane type different from the polyurethanes and polyethers of formula (Ia), (IIa), (IIIa) or (IVa).

Preferably, the polyurethane or the polyether with one, two or three terminal groups of mono-, di- or tri-alkoxysilane type different from the polyurethanes and polyethers of formula (Ia), (IIa), (IIIa) or (IVa) is chosen from:

a polyurethane or a polyether comprising two or three hydrolyzable terminal groups of dialkoxysilane type and corresponding to formula (II):

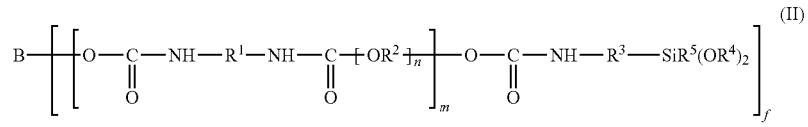

a polyurethane or a polyether comprising two or three hydrolyzable terminal groups of trialkoxysilane type and corresponding to formula (I):

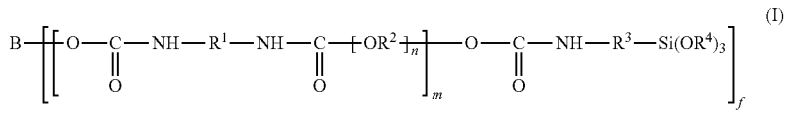

a polyurethane or a polyether comprising two or three hydrolyzable terminal groups of monoalkoxysilane type and corresponding to formula (III):

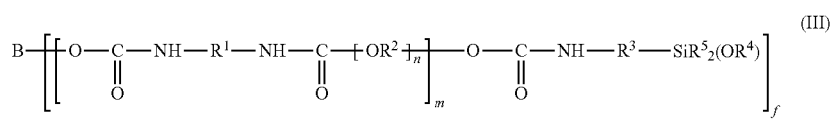

a polyurethane or a polyether comprising one hydrolyzable terminal group of mono-, di- and/or trialkoxysilane type and corresponding to formula (IV):

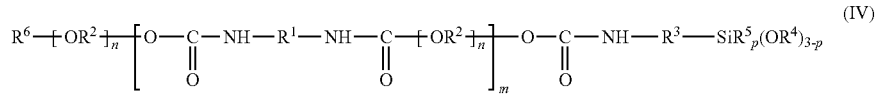

In formulae (I), (II), (III), and (IV) above,
B represents one of the two formulae below:

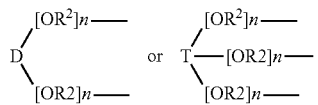

where D and T represent a hydrocarbon radical comprising 2 to 66 carbon atoms, linear, branched, cyclic, alicyclic or aromatic, saturated or unsaturated, optionally comprising one or more heteroatoms, such as oxygen, sulphur, nitrogen or halogen, $R^1$ represents a divalent hydrocarbon radical comprising 5 to 15 carbon atoms which can be aromatic or aliphatic, linear, branched or cyclic, $R^3$ represents a linear or branched divalent alkylene radical comprising 1 to 6 carbon atoms, $R^2$ represents a linear or branched divalent alkylene radical comprising 2 to 4 carbon atoms, and preferably 3 carbon atoms, $R^4$ and $R^5$, identical or different, each represent a linear or branched alkyl radical comprising 1 to 4 carbon atoms, $R^4$ optionally being able to be part of a ring, $R^6$ represents a hydrocarbon radical comprising 1 to 22 carbon atoms, linear, branched, cyclic, alicyclic or aromatic, saturated or unsaturated, optionally comprising one or more heteroatoms, such as oxygen, sulphur, nitrogen or halogen, n is an integer such that the average molar mass of the polyether block of formula —[$OR^2$]$_n$— ranges from 300 g/mol to 40000 g/mol, m is an integer such that the average molar mass of the polymer ranges from 600 g/mol to 100000 g/mol, p is an integer equal to 0, 1 or 2, f is an integer equal to 2 or 3.

The polymers corresponding to one of formulae (I), (II), (III) and (IV) can be obtained according to a process described in applications EP 2 336 208 and WO 2009/106699 with optionally a total substitution or a partial substitution of the polyether diols by polyether monols in the polymers of formula (IV).

According to an embodiment, the mixture of at least two polymers used for the manufacture of the self-adhesive article comprises:

from 5 to 95% by weight, preferably from 10 to 90% by weight, of at least one polymer chosen from the polymers of formulae (Ia), (IIa), (IIIa), (IVa); and from 5 to 95% by weight, preferably from 10 to 90% by weight, of at least one other silylated polymer, preferably chosen from the polymers of formulae (I), (II), (III) or (IV);

with respect to the total weight of the mixture of polymers.

According to an embodiment, the tackifier resin has a number-average molar mass ranging from 100 Da to 5 kDa, preferably 500 Da to 4 kDa.

According to an embodiment, the tackifier resin is chosen from:
(i) the resins able to be obtained by polymerization of terpene hydrocarbons and phenols, in the presence of Friedel-Crafts catalysts,
(ii) the resins able to be obtained by polymerization of alpha-methyl styrene, and optionally by reaction with phenols,
(iii) rosins of natural or modified origin, such as rosin extracted from pine gum, wood rosin extracted from tree roots and their derivatives, hydrogenated, dimerized, polymerized or esterified by monoalcohols or polyols such as glycerol;
(iv) resins obtained by hydrogenation, polymerization or copolymerization (with an aromatic hydrocarbon) of mixtures of unsaturated aliphatic hydrocarbons having approximately 5, 9 or 10 carbon atoms, originating from petroleum cuts;
(v) terpene resins resulting generally from the polymerization of terpene hydrocarbons such as mono-terpene (or pinene) in the presence of Friedel-Crafts catalysts,
(vi) copolymers based on natural terpenes, for example styrene-terpene, alpha-methyl styrene-terpene and vinyl toluene-terpene, and
(vii) acrylic resins.

Such resins are commercially available and from those of type (i), (ii) and (iii) defined above, the following products may be mentioned:

resins of type (i): Dertophene® 1510 available from the company DRT having a number-average molar mass Mn of approximately 870 Da; Dertophene® H150 available from the same company, having a molar mass Mn of approximately 630 Da; Sylvarez® TP 95 available from the company Arizona Chemical having a number-average molar mass Mn of approximately 1200 Da;

resins of type (ii): Norsolene® W100 available from the company Cray Valley, which is obtained by polymerization of alpha-methyl styrene without the action of phenols, with a number-average molar mass of 900 Da; Sylvarez® 510 which is also available from the company Arizona Chemical with a number-average molar mass Mn of approximately 1740 Da, the process of obtaining which also comprises the addition of phenols.

resins of type (iii): Sylvalite® RE 100 which is an ester of rosin and pentaerythritol available from the company Arizona Chemical and having a number-average molar mass Mn of approximately 1700 Da.

The number-average molar masses of the resins can be measured using methods well known to a person skilled in the art, for example by steric exclusion chromatography using polyethylene glycol standard.

According to a preferred variant, a resin chosen from those of type (i) or (ii) is used as a tackifier resin.

According to another preferred variant, a resin of type (iii) and preferably a rosin ester is used as a tackifier resin.

The cross-linking catalyst used in the adhesive composition according to the invention can be any catalyst known to a person skilled in the art for the condensation of silanol. Mention may be made as examples of such catalysts, of organic derivatives of titanium such as titanium acetyl acetonate (commercially available under the name TYZOR® AA75 from the company DuPont), aluminium such as aluminium chelate (commercially available under the name K-KAT® 5218 from the company King Industries), amines such as 1,8-diazobicyclo (5.4.0) undecene-7 or DBU.

Preferably, the adhesive composition comprises less than 5% by weight of solvents, preferably less than 3% by weight, even more preferably less than 1% by weight, ideally less than 0.5% by weight, with respect to the total weight of the adhesive composition before cross-linking of the silylated functions.

Optionally, the composition according to the invention can also include, in combination with the polymer or the mixture of polymers described above, thermoplastic polymers often used in the preparation of the HMPSAs, such as Ethylene Vinyl Acetate (EVA) or styrene block copolymers.

The adhesive composition can moreover comprise up to 3% by weight of a hydrolyzable alkoxysilane derivative, as a desiccant, preferably a trimethoxysilane derivative. Such an agent advantageously extends the shelf-life of the composition according to the invention during storage and transport, before its use. There may be mentioned for example gamma-methacryloxypropyltrimethoxysilane available under the trade name of SILQUEST® A-174 from the company US Momentive Performance Materials Inc.

The composition according to the invention can also include a plasticizer such as a phthalate or a benzoate, a paraffinic and naphthenic oil (such as the Primol® 352 from the company ESSO) or also a wax of a homopolymer of polyethylene (such as A-C® 617 from Honeywell), or a polyethylene and vinyl acetate copolymer wax, or also pigments, colorants or fillers.

Finally, a quantity from 0.1 to 2% by weight of one or more stabilizers (or antioxidants) is preferably included in the composition according to the invention. These compounds are introduced in order to protect the composition from degradation resulting from a reaction with oxygen which is likely to be caused by the action of heat or light. These compounds can include primary antioxidants which trap the free radicals and which are in particular substituted phenols such as Irganox® 1076 from CIBA. The primary antioxidants can be used alone or in combination with other secondary anti-oxidants or UV stabilizers.

According to an embodiment, the adhesive composition comprises:
a) from 20 to 85%, preferably from 40 to 65%, by weight of the polymer or of the mixture of polymers as described above,
b) from 15% to 80%, preferably from 25 to 70%, preferably from 35 to 60%, by weight of tackifier resin(s), and
c) from 0.01 to 3% by weight of cross-linking catalyst(s), with respect to the total weight of the adhesive composition.

According to an embodiment, the adhesive composition consists essentially of:
a) from 20 to 85%, preferably from 40 to 65%, by weight of the polymer or of the mixture of polymers as described above,
b) from 15% to 80%, preferably from 25 to 70%, preferably from 35 to 60%, by weight of tackifier resin(s), and
c) from 0.01 to 3% by weight of cross-linking catalyst(s), with respect to the total weight of the adhesive composition.

The hot cross-linkable adhesive composition used in the manufacture of the self-adhesive article according to the invention can be prepared by a process which comprises:
a step of mixing in the absence of air, preferably under an inert atmosphere, of the polymer or mixture of polymers with the tackifier resin(s), at a temperature comprised between 30 and 170° C., preferably between 100 and 170° C., then a step of cooling said mixture to a temperature ranging from 30 to 90° C., and advantageously approximately 70° C., then
a step of incorporating the cross-linking catalyst into said mixture obtained in the previous step and, if applicable, the desiccant and other optional constituents.

According to an embodiment of the invention, the adhesive layer, after at least partial cross-linking of the silylated functions, has a loop tack of at least 0.75 N/cm, preferably at least 0.80 N/cm, even more preferably at least 0.90 N/cm, ideally at least 1 N/cm, preferably without residues, value measured on a glass plate.

According to an embodiment of the invention, the adhesive layer as described above, can have a loop tack of at least 5 N/cm, preferably at least 6 N/cm, even more preferably at least 7 N/cm, ideally at least 8 N/cm. According to an embodiment, the adhesive composition according to the invention can have a loop tack ranging from 0.75 to 8 N/cm, preferably from 0.80 to 7 N/cm, even more preferably from 0.90 to 6 N/cm, ideally 1 to 5 N/cm. Said loop tack can be obtained immediately after bonding the article onto a surface and/or a few hours after bonding the article onto a surface and/or a few days after bonding the article onto a surface.

Within the meaning of the present invention, the term "self-adhesive article" includes any article which can be bonded onto a surface by the effect of manual or mechanical pressure alone, without the use of additional glues or adhesives. The expression "self-adhesive article" also comprises the expression "Pressure Sensitive Adhesive" article or "PSA" article. The purpose of these articles is to be applied on a surface to be bonded in order to bring closer together, hold, fix, or simply to immobilize, to display shapes, logos, images or information. These articles can be used in many fields, such as the medical field, clothing, packaging, automobile or construction, thanks in particular to excellent thermal and sound insulation properties. They can be formed according to their end use, for example in the form of tapes, such as tapes for industrial use, tapes for DIY use or for fixing on construction sites, single- or double-sided tapes, or in the form of labels, bandages, dressings, patches or graphic films.

The self-adhesive article according to the invention can be applied onto surfaces with irregularities, onto curved or complex surfaces or also onto surfaces that may be deformed or that have deformations. The article according to the invention can make it possible to bond two surfaces that are not strictly flat. In particular, the surface to be bonded can have properties comparable to the properties of the support layer.

The surface to be bonded can be chosen from plastics, concrete, steel, glass, cardboard, skin, textiles, foam. The surface may or may not be painted.

According to an embodiment of the invention, the self-adhesive article also comprises a non-stick protective release liner ("release liner").

According to an embodiment, said release liner is applied onto the adhesive layer, after cross-linking the adhesive composition.

According to a first embodiment, the self-adhesive article according to the invention can be prepared by a process comprising the following steps:

(a) conditioning the adhesive composition as defined previously at a temperature ranging from 20 to 160° C.; then (b) coating the adhesive composition obtained in step (a) onto a bearing surface; then (c) cross-linking the coated adhesive composition, by heating the coated bearing surface at a temperature ranging from 20 to 200° C.;

optionally (d) laminating or transfer of the cross-linked adhesive layer onto a support layer or onto a non-stick protective film.

By "bearing surface" within the meaning of the present invention is meant either a conveyor belt covered with a non-stick layer, or a release liner, or a support layer.

In the case where the bearing surface is not a support layer, the process of obtaining the self-adhesive article according to the invention comprises step (d) of transferring the cross-linked adhesive layer onto a support layer.

In the case where the bearing surface is a support layer, the process of obtaining the self-adhesive article according to the invention may comprise step (d) of laminating the cross-linked adhesive layer onto a non-stick protective film.

According to an embodiment, the process of manufacturing the self-adhesive article according to the invention also comprises a step (e) of coating a second layer of adhesive composition onto the support layer followed by a step (f) of cross-linking the adhesive composition coated in step (e) by heating at a temperature ranging from 20 to 200° C. According to this embodiment, a double-sided self-adhesive article is obtained.

The coating step (b) can be carried out by means of known coating devices, such as for example a lip- or curtain-type nozzle, or also with a roller. It uses a weight per unit area of adhesive composition ranging from 3 to 2000 g/m$^2$, preferably from 5 to 500 g/m$^2$, even more preferably from 10 to 250 g/m$^2$.

Preferably, the coating is continuous or practically continuous.

According to an embodiment, during step (c) the coated adhesive composition moreover undergoes a treatment in a moist atmosphere characterized by its moisture level. Preferably, the moist atmosphere is a atmosphere in which from 2 to 100% of the molecules are water molecules, preferably from 4 to 50%, even more preferably from 5 to 10% of the molecules are water molecules.

The moisture level is expressed as a percentage of water per unit of volume, which corresponds to the number of molecules of water divided by the total number of molecules in a unit of volume. Due to the linear nature of this scale, the moisture level is easily measured and controlled by using for example P.I.D (Proportional-Integral-Derivative) type monitors. The percentage by weight can be calculated by multiplying the percentage of the number of molecules of water with respect to the total number of molecules by a factor of 0.622. General information on the moisture level in various environments is described by W. Wagner et al., in "*International Steam Tables—Properties of Water and Steam based on the Industrial Formula IAPWS-IF97*".

The time necessary for the cross-linking step (c) can vary within wide limits, for example between 1 second and 10 minutes, depending on the weight per unit area of adhesive composition deposited on the bearing surface, the heating temperature, and the moisture.

This step of thermal cross-linking results in the creation—between the polymer chains of the polymer or of the mixture of polymers as described above and under the action of moisture—of siloxane-type bonds which lead to the formation of a three-dimensional polymer network. The adhesive composition that is cross-linked in this way is a pressure-sensitive adhesive which confers the desired adhesive power and tack on the support coated therewith.

Preferably, the coating is carried out uniformly on the support layer or on the release liner but the coating can also be adapted to the desired shape of the final self-adhesive article.

According to an embodiment, the coating by the adhesive composition is performed on at least a part of both faces of the support layer. If both faces of the support layer are coated, the adhesive composition can be identical or different on the two faces, and the weight per unit area can be identical or different on the two faces.

According to an embodiment of the invention, the self-adhesive article comprises an adhesive layer over at least a part of one face or both faces of the support layer, said adhesive layer(s) being optionally coated with a release liner. According to an embodiment, the self-adhesive article comprises two release liners on each of the two adhesive layers. In this case, the two protective layers can be made from identical or different materials and/or they can have an identical or different thickness.

The self-adhesive article according to the invention can be used in a bonding method comprising the following steps:

a) removing the non-stick protective film (release liner), when such a film is present;

b) applying the article onto a surface; and c) applying pressure on said article.

According to an embodiment in which the self-adhesive article is a double-sided article, the bonding method also comprises a step in which either a second surface is applied onto the article bonded onto the first surface or the article bonded onto the first surface is applied onto a second surface.

Mixture of at Least Two Polymers

The present invention also relates to a mixture of at least two polymers, able to be incorporated into the adhesive composition used for the manufacture of the self-adhesive article according to the invention. The mixture of at least two polymers according to the invention comprises at least two polymers belonging to 2 different groups chosen from groups P1, P2, P3 and P4, it being understood that at least one of the two polymers of the mixture corresponds to one of formulae (Ia), (IIa), (IIIa) or (IVa).

As stated above for the self-adhesive article, the polymers of formula (Ia), (IIa), (IIIa) and (IVa) according to the invention have a quantity of silyl functions less than or equal to 0.480 meq/g of polymer, preferably less than or equal to 0.450 meq/g of polymer.

Preferably, all the polymers of the mixture of at least two polymers have a quantity of silyl functions less than or equal to 0.480 meq/g of polymer, preferably less than or equal to 0.450 meq/g of polymer.

Preferably, the mixture of polymers according to the invention has an average molar mass ranging from 600 to 100000 g/mol, even more preferably 1000 to 50000 g/mol, even more preferably 2000 to 20000 g/mol.

The groups are defined as follows:

Group P1: polyurethane or polyether with two or three terminal groups of trialkoxysilane type; examples: polymer corresponding to formula (Ia) or (I), Group P2: polyurethane or polyether with two or three terminal groups of dialkoxysilane type; example: polymer corresponding to formula (IIa) or (II), Group P3: polyurethane or polyether with two or three terminal groups of monoalkoxysilane type; example: polymer corresponding to formula (IIIa) or (III), Group P4: polyurethane or polyether with one terminal group of mono-, di- or tri-alkoxysilane type; example: polymer corresponding to formula (IVa) or (IV).

When a polymer belonging to group P1 is present in the mixture of at least two polymers according to the invention, said mixture comprises up to 99% by weight, with respect to the total weight of said mixture, of one or more polymers of group P1.

When a polymer belonging to group P2 is present in the mixture of at least two polymers according to the invention, said mixture comprises up to 99% by weight, with respect to the total weight of said mixture, of one or more polymers of group P2.

When a polymer belonging to group P3 is present in the mixture of at least two polymers according to the invention, said mixture comprises up to 15% by weight, with respect to the total weight of said mixture, of one or more polymers of group P3.

When a polymer belonging to group P4 is present in the mixture of at least two polymers according to the invention, said mixture comprises up to 15% by weight, with respect to the total weight of said mixture, of one or more polymers of group P4.

Preferably, the mixture of at least two polymers comprises essentially polymers of groups P1, P2, P3 and P4. Preferably, the mixture of at least two polymers according to the invention does not include polymers other that those belonging to groups P1, P2, P3 and P4.

According to a first embodiment of the invention, the mixture of at least two polymers comprises:
  up to 95% by weight, with respect to the total weight of the mixture of polymers, of at least one polymer belonging to group P1, and
  at least one polymer belonging to group P2.

According to this embodiment, preferably, the mixture of at least two polymers comprises:
  from 10 to 95% by weight, preferably from 20 to 90% by weight, even more preferably from 25 to 85% by weight, advantageously from 30 to 75% by weight, of at least one polymer belonging to group P1, and
  from 5 to 90% by weight, preferably from 10 to 80% by weight, even more preferably from 15 to 75% by weight, advantageously from 25 to 70% by weight, of at least one polymer belonging to group P2,
with respect to the total weight of the mixture of at least two polymers.

According to this embodiment of the invention, preferably the mixture of at least two polymers consists essentially of:
  up to 95% by weight, with respect to the total weight of the mixture of polymers, of at least one polymer belonging to group P1, and
  at least one polymer belonging to group P2.

According to this embodiment, preferably, the mixture of at least two polymers consists essentially of:
  from 10 to 95% by weight, preferably from 20 to 90% by weight, even more preferably from 25 to 85% by weight, advantageously from 30 to 75% by weight, of at least one polymer belonging to group P1, and
  from 5 to 90% by weight, preferably from 10 to 80% by weight, even more preferably from 15 to 75% by weight, advantageously from 25 to 70% by weight, of at least one polymer belonging to group P2,
with respect to the total weight of the mixture of at least two polymers.

According to a second embodiment of the invention, the mixture of at least two polymers comprises:
  up to 95% by weight, with respect to the total weight of the mixture of polymers, of at least one polymer belonging to group P1, and
  up to 15% by weight, with respect to the total weight of the mixture of polymers, of at least one polymer belonging to group P3.

According to this embodiment, preferably, the mixture of at least two polymers comprises:
  from 10 to 95% by weight, preferably from 20 to 90% by weight, even more preferably from 25 to 85% by weight, advantageously from 30 to 75% by weight, of at least one polymer belonging to group P1, and
  from 5 to 15% by weight, preferably from 7 to 15% by weight, even more preferably from 9 to 12% by weight, of at least one polymer belonging to group P3,
with respect to the total weight of the mixture of at least two polymers.

According to this embodiment of the invention, preferably the mixture of at least two polymers consists essentially of:
  up to 95% by weight, with respect to the total weight of the mixture of polymers, of at least one polymer belonging to group P1, and
  up to 15% by weight, with respect to the total weight of the mixture of polymers, of at least one polymer belonging to group P3.

According to this embodiment, preferably, the mixture of at least two polymers consists essentially of:
  from 10 to 95% by weight, preferably from 20 to 90% by weight, even more preferably from 25 to 85% by weight, advantageously from 30 to 75% by weight, of at least one polymer belonging to group P1, and
  from 5 to 15% by weight, preferably from 7 to 15% by weight, even more preferably from 9 to 12% by weight, of at least one polymer belonging to group P3,
with respect to the total weight of the mixture of at least two polymers.

According to a third embodiment of the invention, the mixture of at least two polymers comprises:
  at least one polymer belonging to group P2, and
  up to 15% by weight, with respect to the total weight of the mixture of polymers, of at least one polymer belonging to group P3.

According to this embodiment, preferably, the mixture of at least two polymers comprises:
  from 85 to 99% by weight, preferably from 87 to 97% by weight, even more preferably from 90 to 95% by weight, of at least one polymer belonging to group P2, and
  from 1 to 15% by weight, preferably from 3 to 13% by weight, even more preferably from 5 to 10% by weight, of at least one polymer belonging to group P3,
with respect to the total weight of the mixture of at least two polymers.

According to this embodiment of the invention, preferably the mixture of at least two polymers consists essentially of:
  at least one polymer belonging to group P2, and
  up to 15% by weight, with respect to the total weight of the mixture of polymers, of at least one polymer belonging to group P3.

According to this embodiment, preferably, the mixture of at least two polymers consists essentially of:

from 85 to 99% by weight, preferably from 87 to 97% by weight, even more preferably from 90 to 95% by weight, of at least one polymer belonging to group P2, and from 1 to 15% by weight, preferably from 3 to 13% by weight, even more preferably from 5 to 10% by weight, of at least one polymer belonging to group P3, with respect to the total weight of the mixture of at least two polymers.

According to a fourth embodiment of the invention, the mixture of at least two polymers comprises:

up to 95% by weight, with respect to the total weight of the mixture of polymers, of at least one polymer belonging to group P1, and up to 15% by weight, with respect to the total weight of the mixture of polymers, of at least one polymer belonging to group P4.

According to this embodiment, preferably, the mixture of at least two polymers comprises:

from 10 to 95% by weight, preferably from 20 to 90% by weight, even more preferably from 25 to 85% by weight, advantageously from 30 to 75% by weight, of at least one polymer belonging to group P1, and from 5 to 15% by weight, preferably from 7 to 15% by weight, even more preferably from 9 to 12% by weight, of at least one polymer belonging to group P4, with respect to the total weight of the mixture of at least two polymers.

According to this embodiment of the invention, preferably the mixture of at least two polymers consists essentially of:

up to 95% by weight, with respect to the total weight of the mixture of polymers, of at least one polymer belonging to group P1, and up to 15% by weight, with respect to the total weight of the mixture of polymers, of at least one polymer belonging to group P4.

According to this embodiment, preferably, the mixture of at least two polymers consists essentially of:

from 10 to 95% by weight, preferably from 20 to 90% by weight, even more preferably from 25 to 85% by weight, advantageously from 30 to 75% by weight, of at least one polymer belonging to group P1, and from 5 to 15% by weight, preferably from 7 to 15% by weight, even more preferably from 9 to 12% by weight, of at least one polymer belonging to group P4, with respect to the total weight of the mixture of at least two polymers.

According to a fifth embodiment of the invention, the mixture of at least two polymers comprises:

at least one polymer belonging to group P2, and up to 15% by weight, with respect to the total weight of the mixture of polymers, of at least one polymer belonging to group P4.

According to this embodiment, preferably, the mixture of at least two polymers comprises:

from 85 to 99% by weight, preferably from 87 to 97% by weight, even more preferably from 90 to 95% by weight, of at least one polymer belonging to group P2, and from 1 to 15% by weight, preferably from 3 to 13% by weight, even more preferably from 5 to 10% by weight, of at least one polymer belonging to group P4, with respect to the total weight of the mixture of at least two polymers.

According to this embodiment of the invention, preferably the mixture of at least two polymers consists essentially of:

at least one polymer belonging to group P2, and up to 15% by weight, with respect to the total weight of the mixture of polymers, of at least one polymer belonging to group P4.

According to this embodiment, preferably, the mixture of at least two polymers consists essentially of:

from 85 to 99% by weight, preferably from 87 to 97% by weight, even more preferably from 90 to 95% by weight, of at least one polymer belonging to group P2, and from 1 to 15% by weight, preferably from 3 to 13% by weight, even more preferably from 5 to 10% by weight, of at least one polymer belonging to group P4, with respect to the total weight of the mixture of at least two polymers.

According to an embodiment of the invention, the mixture of at least two polymers comprises:

up to 95% by weight, with respect to the total weight of the mixture of polymers, of at least one polymer corresponding to formula (Ia), and at least one polymer corresponding to formula (IIa).

According to this embodiment, preferably, the mixture of at least two polymers comprises:

from 10 to 95% by weight, preferably from 20 to 90% by weight, even more preferably from 25 to 85% by weight, advantageously from 30 to 75% by weight, of at least one polymer corresponding to formula (Ia), and from 5 to 90% by weight, preferably from 10 to 80% by weight, even more preferably from 15 to 75% by weight, advantageously from 25 to 70% by weight, of at least one polymer corresponding to formula (IIa), with respect to the total weight of the mixture of at least two polymers.

According to this embodiment of the invention, preferably the mixture of at least two polymers consists essentially of:

up to 95% by weight, with respect to the total weight of the mixture of polymers, of at least one polymer corresponding to formula (Ia), and at least one polymer corresponding to formula (IIa).

According to this embodiment of the invention, preferably, the mixture of at least two polymers consists essentially of:

from 10 to 95% by weight, preferably from 20 to 90% by weight, even more preferably from 25 to 85% by weight, advantageously from 30 to 75% by weight, of at least one polymer corresponding to formula (Ia), and from 5 to 90% by weight, preferably from 10 to 80% by weight, even more preferably from 15 to 75% by weight, advantageously from 25 to 70% by weight, of at least one polymer corresponding to formula (IIa), with respect to the total weight of the mixture of at least two polymers.

According to another embodiment of the invention, the mixture of at least two polymers comprises:

up to 95% by weight, with respect to the total weight of the mixture of polymers, of at least one polymer corresponding to formula (Ia), and up to 15% by weight, with respect to the total weight of the mixture of polymers, of at least one polymer corresponding to formula (IIIa).

According to this embodiment of the invention, preferably, the mixture of at least two polymers comprises:

from 10 to 95% by weight, preferably from 20 to 90% by weight, even more preferably from 25 to 85% by weight, advantageously from 30 to 75% by weight, of at least one polymer corresponding to formula (Ia), and from 5 to 15% by weight, preferably from 7 to 15% by weight, even more preferably from 9 to 12% by weight, of at least one polymer corresponding to formula (IIIa), with respect to the total weight of the mixture of at least two polymers.

According to this embodiment of the invention, preferably the mixture of at least two polymers consists essentially of:

up to 95% by weight, with respect to the total weight of the mixture of polymers, of at least one polymer corresponding to formula (Ia), and up to 15% by weight, with respect to the total weight of the mixture of polymers, of at least one polymer corresponding to formula (IIIa).

According to this embodiment of the invention, preferably, the mixture of at least two polymers consists essentially of:

from 10 to 95% by weight, preferably from 20 to 90% by weight, even more preferably from 25 to 85% by weight, advantageously from 30 to 75% by weight, of at least one polymer corresponding to formula (Ia), and from 5 to 15% by weight, preferably from 7 to 15% by weight, even more preferably from 9 to 12% by weight, of at least one polymer corresponding to formula (IIIa), with respect to the total weight of the mixture of at least two polymers.

According to another embodiment of the invention, the mixture of at least two polymers comprises:

at least one polymer corresponding to formula (IIa), and up to 15% by weight, with respect to the total weight of the mixture of polymers, of at least one polymer corresponding to formula (IIIa).

According to this embodiment of the invention, preferably, the mixture of at least two polymers comprises:

from 85 to 99% by weight, preferably from 87 to 97% by weight, even more preferably from 90% to 95% by weight, of at least one polymer corresponding to formula (IIa), and from 1 to 15% by weight, preferably from 3 to 13% by weight, even more preferably from 5 to 10% by weight, of at least one polymer corresponding to formula (IIIa), with respect to the total weight of the mixture of at least two polymers.

According to this embodiment of the invention, preferably the mixture of at least two polymers consists essentially of:

at least one polymer corresponding to formula (IIa), and up to 15% by weight, with respect to the total weight of the mixture of polymers, of at least one polymer corresponding to formula (IIIa).

According to this embodiment of the invention, preferably, the mixture of at least two polymers consists essentially of:

from 85 to 99% by weight, preferably from 87 to 97% by weight, even more preferably from 90% to 95% by weight, of at least one polymer corresponding to formula (IIa), and from 1 to 15% by weight, preferably from 3 to 13% by weight, even more preferably from 5 to 10% by weight, of at least one polymer corresponding to formula (IIIa), with respect to the total weight of the mixture of at least two polymers.

According to another embodiment of the invention, the mixture of at least two polymers comprises:

up to 95% by weight, with respect to the total weight of the mixture of polymers, of at least one polymer corresponding to formula (Ia), and up to 15% by weight, with respect to the total weight of the mixture of polymers, of at least one polymer corresponding to formula (IVa).

According to this embodiment of the invention, preferably, the mixture of at least two polymers comprises:

from 10 to 95% by weight, preferably from 20 to 90% by weight, even more preferably from 25 to 85% by weight, advantageously from 30 to 75% by weight, of at least one polymer corresponding to formula (Ia), and from 5 to 15% by weight, preferably from 7 to 15% by weight, even more preferably from 9 to 12% by weight, of at least one polymer corresponding to formula (IVa), with respect to the total weight of the mixture of at least two polymers.

According to this embodiment of the invention, preferably the mixture of at least two polymers consists essentially of:

up to 95% by weight, with respect to the total weight of the mixture of polymers, of at least one polymer corresponding to formula (Ia), and up to 15% by weight, with respect to the total weight of the mixture of polymers, of at least one polymer corresponding to formula (IVa).

According to this embodiment of the invention, preferably, the mixture of at least two polymers consists essentially of:

from 10 to 95% by weight, preferably from 20 to 90% by weight, even more preferably from 25 to 85% by weight, advantageously from 30 to 75% by weight, of at least one polymer corresponding to formula (Ia), and from 5 to 15% by weight, preferably from 7 to 15% by weight, even more preferably from 9 to 12% by weight, of at least one polymer corresponding to formula (IVa), with respect to the total weight of the mixture of at least two polymers.

According to another embodiment of the invention, the mixture of at least two polymers comprises:

at least one polymer corresponding to formula (IIa), and up to 15% by weight, with respect to the total weight of the mixture of polymers, of at least one polymer corresponding to formula (IVa).

According to this embodiment of the invention, preferably, the mixture of at least two polymers comprises:

from 85 to 99% by weight, preferably from 87 to 97% by weight, even more preferably from 90% to 95% by weight, of at least one polymer corresponding to formula (IIa), and from 1 to 15% by weight, preferably from 3 to 13% by weight, even more preferably from 5 to 10% by weight, of at least one polymer corresponding to formula (IVa), with respect to the total weight of the mixture of at least two polymers.

According to this embodiment of the invention, preferably the mixture of at least two polymers consists essentially of:

at least one polymer corresponding to formula (IIa), and up to 15% by weight, with respect to the total weight of the mixture of polymers, of at least one polymer corresponding to formula (IVa).

According to this embodiment of the invention, preferably, the mixture of at least two polymers consists essentially of:

from 85 to 99% by weight, preferably from 87 to 97% by weight, even more preferably from 90% to 95% by weight, of at least one polymer corresponding to formula (IIa), and from 1 to 15% by weight, preferably from 3 to 13% by weight, even more preferably from 5 to 10% by weight, of at least one polymer corresponding to formula (IVa), with respect to the total weight of the mixture of at least two polymers.

According to an embodiment, the mixture of at least two polymers comprises essentially polymers corresponding to formulae (Ia), (IIa), (IIIa) and (IVa) described above. Preferably, the mixture of at least two polymers according to the invention does not include polymers other that those corresponding to formulae (Ia), (IIa), (IIIa) and (IVa) described above.

According to another embodiment, the mixture of at least two polymers comprises:

at least one polymer corresponding to one of formulae (Ia), (IIa), (IIIa) and (IVa), and at least one other silylated polymer belonging to one of groups P1, P2, P3 and P4, it being understood that the other silylated polymer does not belong to the same group as the polymer of formula (Ia), (IIa), (IIIa) or (IVa).

By "other silylated polymer", is meant a polymer different from the polymers of formulae (Ia), (IIa), (IIIa) and (IVa) and comprising at least one silylated function corresponding to the general formula: $-Si(R^5)_p(OR^4)_{3-p}$ where $R^5$, $R^4$ and p have the same meaning as above.

Preferably, the other silylated polymer or polymers are chosen from:

a polyurethane or a polyether, belonging to group P2, comprising two or three hydrolyzable terminal groups of dialkoxysilane type and corresponding to formula (II):

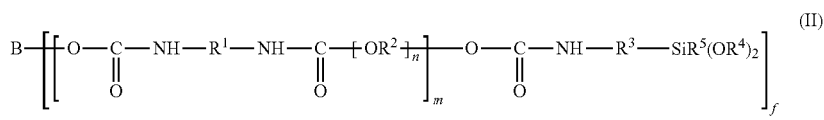

a polyurethane or a polyether, belonging to group P1, comprising two or three hydrolyzable terminal groups of trialkoxysilane type and corresponding to formula (I):

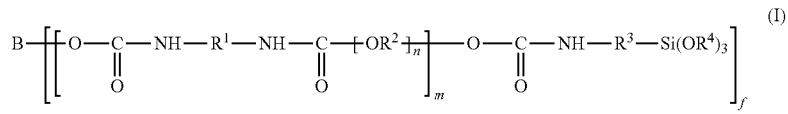

a polyurethane or a polyether, belonging to group P3, comprising two or three hydrolyzable terminal groups of monoalkoxysilane type and corresponding to formula (III):

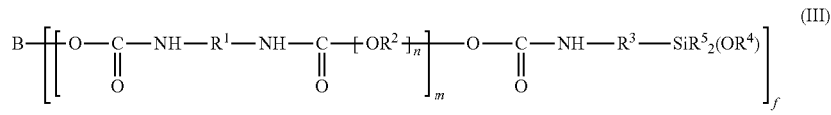

a polyurethane or a polyether, belonging to group P4, comprising one hydrolyzable terminal group of mono-, di- and/or trialkoxysilane type and corresponding to formula (IV):

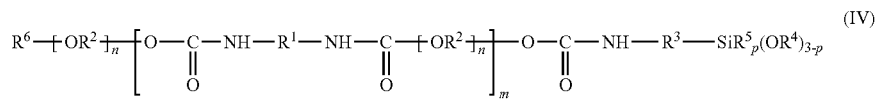

alone or in a mixture.

In formulae (I), (II), (III), and (IV) above:
B represents one of the two formulae below:

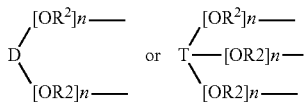

where D and T represent a hydrocarbon radical comprising 2 to 66 carbon atoms, linear, branched, cyclic, alicyclic or aromatic, saturated or unsaturated, optionally comprising one or more heteroatoms, such as oxygen, sulphur, nitrogen or halogen, $R^1$ represents a divalent hydrocarbon radical comprising 5 to 15 carbon atoms which can be aromatic or aliphatic, linear, branched or cyclic, $R^3$ represents a linear or branched divalent alkylene radical comprising 1 to 6 carbon atoms, $R^2$ represents a linear or branched divalent alkylene radical comprising 2 to 4 carbon atoms, preferably 3 carbon atoms, $R^4$ and $R^5$, identical or different, each represent a linear or branched alkyl radical comprising 1 to 4 carbon atoms, $R^4$ optionally being able to be part of a ring, $R^6$ represents a hydrocarbon radical comprising 1 to 22 carbon atoms, linear, branched, cyclic, alicyclic or aromatic, saturated or unsaturated, optionally comprising one or more heteroatoms, such as oxygen, sulphur, nitrogen or halogen, n is an integer such that the average molar mass of the polyether block of formula —$[OR^2]_n$— ranges from 300 g/mol to 40000 g/mol, m is an integer such that the average molar mass of the polymer ranges from 600 g/mol to 100000 g/mol, p is an integer equal to 0, 1 or 2.

f is an integer equal to 2 or 3.

The polymers corresponding to one of formulae (I), (II), (III) and (IV) can be obtained according to a process described in applications EP 2 336 208 and WO 2009/106699 with optionally a total substitution or a partial substitution of the polyether diols by polyether monols in the polymers of formula (IV).

Preferably, the mixture of at least two polymers according to the invention comprises:

from 5 to 95% by weight, preferably from 10 to 90% by weight, of at least one polymer corresponding to one of formulae (Ia), (IIa), (IIIa) and (IVa); and from 5 to 95% by weight, preferably from 10 to 90% by weight, of at least one other silylated polymer, preferably chosen from the polymers of formula (I), (II), (III) or (IV), with respect to the total weight of the mixture of at least two polymers, it being understood that the mixture comprises at least two polymers belonging to 2 different groups chosen from groups P1, P2, P3 and P4.

Adhesive Composition

The present invention also relates to an adhesive composition suitable for use for the manufacture of the self-adhesive article according to the invention.

The composition according to the invention comprises:
a) the mixture of at least two polymers according to the invention,
b) at least one tackifier resin, and
c) at least one cross-linking catalyst.

According to an embodiment, the adhesive composition according to the invention comprises:
a) from 20 to 85% by weight, preferably from 40 to 65% by weight, of the mixture of at least two polymers according to the invention,
b) from 15 to 80% by weight, preferably from 25 to 70% by weight, even more preferably from 35 to 60% by weight, of tackifier resin(s),
c) from 0.01 to 3% by weight of cross-linking catalyst(s).
with respect to the total weight of the adhesive composition.

According to an embodiment, the adhesive composition according to the invention consists essentially of:
a) from 20 to 85% by weight, preferably from 40 to 65% by weight, of the mixture of at least two polymers according to the invention,
b) from 15 to 80% by weight, preferably from 25 to 70% by weight, even more preferably from 35 to 60% by weight, of tackifier resin(s),
c) from 0.01 to 3% by weight of cross-linking catalyst(s).
with respect to the total weight of the adhesive composition.

Preferably, the tackifier resin is as described previously for the self-adhesive article according to the invention.

Preferably, the cross-linking catalyst is as described previously for the self-adhesive article according to the invention.

According to an embodiment, the adhesive composition according to the invention also comprises one or more additives chosen from desiccants, plasticizers, stabilizers (or antioxidants). Preferably, these additives are as described previously for the self-adhesive article according to the invention.

The adhesive composition according to the invention can be prepared by a process comprising:

a step of mixing in the absence of air, preferably under an inert atmosphere, of the mixture of at least two polymers with the tackifier resin(s), at a temperature comprised between 30 and 170° C., preferably between 100 and 170° C., then a step of cooling said mixture to a temperature ranging from 30 to 90° C., and advantageously approximately 70° C., then a step of incorporating the cross-linking catalyst into said mixture obtained in the previous step and, if applicable, the desiccant and other optional constituents.

The adhesive composition according to the invention is not described in the prior art. The adhesive composition according to the invention can be used with a support different from the support layer described above for the self-adhesive article according to the invention.

The adhesive composition according to the invention can be used for the manufacture of a self-adhesive article, comprising a temporary or permanent support and an adhesive layer, said adhesive layer being obtained by cross-linking the adhesive composition.

The support of the self-adhesive article obtained from the adhesive composition according to the invention can be a temporary or permanent support.

In the case where the support is a temporary support, the support is preferably a non-stick protective film ("release liner"). In this case, once the article is bonded onto a surface, the bonded article comprises only an adhesive layer, the temporary supports being intended to be removed.

In the case where the support is a permanent support, the support can be based on any materials that can be used for the manufacture of pressure-sensitive (PSA), such as polypropylene, polyethylene, polyimide and paper. The support can be made from fibre or plastic tapes, fabric, metal fibre or glass fibre.

According to an embodiment, the support is based on polyethylene terephthalate (PET), polypropylene (PP) or polyurethane (PU).

According to an embodiment of the invention, the support is in the form of a grid or mesh or a non-woven material. In this case, the adhesive layer can be present on a single face of the support, but can also penetrate within the support during the application of the adhesive composition thanks to the porous nature of the support, so that the fibres of the support are completely coated with the adhesive composition. In this case, a non-stick protective film is preferably present on the adhesive layer or adhesive composition.

According to an embodiment, the self-adhesive article obtained from the adhesive composition according to the invention comprises a permanent support coated with an adhesive layer. Preferably, the adhesive layer is moreover coated with a non-stick protective film, preferably a siliconized film.

By way of alternative to the non-stick protective film, the back face of the permanent support which is not coated with the adhesive layer, can have a non-stick surface, for example a siliconized protective layer.

The two embodiments described above make it possible to roll up the self-adhesive article then unroll it without problems of transfer of adhesive between the adhesive layer and the permanent support.

According to an embodiment, the permanent support is coated on both faces with an adhesive composition, which can be identical or different, at least one of the two adhesive compositions being according to the invention.

Supports can be prepared from the following materials:
polyurethane materials Estane™ 58309 NAT022 (B.F. Goodrich, Cleveland, Ohio),
polyurethane Rucothane™ or polyester elastomer HytreFM 4056 (DuPont, Wilmington, Del.),
polyether block amide Pebax™ 2533 or 3533 (Arkema, Paris, France).

The self-adhesive article obtained from the adhesive composition according to the invention can be manufactured according to a process as described previously for the self-adhesive article according to the invention.

The self-adhesive article can be used in a bonding process comprising the following steps:
a) removing the non-stick protective film, when such a film is present;
b) applying the article onto a surface; and
c) applying pressure on said article.

According to an embodiment in which the self-adhesive article is a double-sided article, the bonding process also comprises a step of applying the article bonded onto the first surface onto a second surface.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 13/63674, filed Dec. 30, 2013 are incorporated by reference herein.

EXAMPLES

Different adhesive compositions were tested on two different types of support layer: a PET support and a support made from foam according to the invention.

The following polymers were used:
GENIOSIL® STP-15 (available from Wacker): polyether of group P1 corresponding to formula (I) with two terminal groups of trimethoxysilane type, an average molar mass of approximately 10000 g/mol, a polydispersity of approximately 1.6 and a quantity of silyl functions of 0.200 milliequivalent per gram of polymer;

GENIOSIL® STP-30 (available from Wacker): polyether of group P2 corresponding to formula (II) with two terminal groups of dimethoxysilane type, an average molar mass of approximately 14493 g/mol, a polydispersity of approximately 1.6 and a quantity of silyl functions of 0.138 milliequivalent per gram of polymer;

Polyurethane A as described in international application WO 2009/106699: polyurethane of group P1 corresponding to formula (I) with two terminal groups of trimethoxysilane type, an average molar mass of approximately 16393 g/mol, a dispersity of approximately 1.7 and a quantity of silyl functions of 0.122 milliequivalent per gram of polymer;

SPUR+® 1050MM (available from Momentive): polyurethane of group P1 corresponding to formula (I) with two terminal groups of trimethoxysilane type, an average molar mass of approximately 16393 g/mol, a polydispersity of approximately 1.7 and a quantity of silyl functions of 0.122 milliequivalent per gram of polymer;

MS Polymer® SAT 145 (available from Kaneka): polymer with one terminal group of dimethoxysilane type, an average molar mass of approximately 3497 g/mol, a dispersity of approximately 2.1 and a quantity of silyl functions of 0.286 milliequivalent per gram of polymer;

Polymer Ex8: polyether of group P2 corresponding to formula (IIa) with two terminal groups of diethoxysilane type, an average molar mass of approximately 5376 g/mol and a quantity of silyl functions of 0.372 meq/g;

Polymer Ex15: polyether of group P3 corresponding to formula (IIIa) with 2 terminal groups of monoethoxysilane type, an average molar mass of approximately 5263 g/mol and a quantity of silyl functions of 0.380 meq/g;

Polymer Ex6-18: polyether of group P2 corresponding to formula (IIa) with 3 terminal groups of diethoxysilane type, an average molar mass of approximately 7160 g/mol and a quantity of silyl functions of 0.419 meq/g;

Polymer Ex19: polyether of group P1 corresponding to formula (Ia) with 3 terminal groups of trimethoxysilane type, an average molar mass of approximately 6818 g/mol and a quantity of silyl functions of 0.440 meq/g;

Polymer Ex20: polyether of group P1 corresponding to formula (Ia) with 2 terminal groups of trimethoxysilane type, an average molar mass of approximately 5376 g/mol and a quantity of silyl functions of 0.372 meq/g;

Polymer ExC6: polyether of group P1 with 2 terminal groups of trimethoxysilane type, an average molar mass of approximately 4000 g/mol and a quantity of silyl functions of 0.500 meq/g.

The polymer Ex8 is prepared according to the following procedure:
Introducing 84.1 g of polyol ACCLAIM® 8200 (available from Bayer) into a glass synthesis apparatus, under a nitrogen atmosphere and under vacuum, heated to approximately 85-90° C.; then
Introducing 0.1 g of catalyst BORCHI KAT® VP 0244 (bismuth/zinc neodecanoate available from the company Société Borchers); then
Maintaining the apparatus under vacuum at 85-90° C. for approximately 1 hour; then
Introducing 6.4 g of isophorone diisocyanate;
Maintaining at 85-90° C. under nitrogen for approximately 2 hours until a level of NCO functions between 1.5 and 1.9% is obtained (level measured by assaying a sample); then
Cooling the apparatus to 65-70° C.; then
Introducing 9.01 g of GENIOSIL® XL924 (N-cyclohexylaminomethyl-methyldiethoxysilane available from Wacker);
Maintaining at 70° C. under a nitrogen atmosphere for approximately 1 hour until the NCO functions totally disappear.

The polymer Ex15 is prepared according to the following procedure:
Introducing 87.3 g of polyol ACCLAIM® 8200 (available from Bayer) into a glass synthesis apparatus, under a nitrogen atmosphere and under vacuum, heated to approximately 85-90° C.; then
Introducing 0.1 g of catalyst BORCHI KAT® VP 0244 (bismuth/zinc neodecanoate available from Société Borchers); then
Maintaining the apparatus for approximately 1 hour under vacuum at 85-90° C.; then
Introducing 6.6 g of isophorone diisocyanate;
Maintaining at 85-90° C. under nitrogen for approximately 2 hours until a level of NCO functions between 1.5 and 1.9% is obtained (level measured by assaying a sample); then
Cooling the apparatus to 65-70° C.; then
Introducing 6.14 g of 3-aminopropyldimethyl-ethoxysilane; then
Maintaining at 70° C. under a nitrogen atmosphere for approximately 1 hour until the NCO functions totally disappear.

The polymer Ex19 is prepared according to the following procedure:
Introducing 82.18 g of polyol ACCLAIM® 6300 (available from Bayer) into a glass synthesis apparatus, under a nitrogen atmosphere and under vacuum, heated to approximately 85-90° C.; then
Introducing 0.04 g of catalyst BORCHI KAT® VP 0244 (bismuth/zinc neodecanoate available from Société Borchers); then
Maintaining the apparatus for approximately 1 hour under vacuum at 85-90° C.; then
Introducing 9.44 g of isophorone diisocyanate;
Maintaining at 85-90° C. under nitrogen for approximately 2 hours until a level of NCO functions between 1.8 and 2.2% is obtained (level measured by assaying a sample); then
Cooling the apparatus to 65-70° C.; then
Introducing 7.84 g of Silane® A1110 (gamma-aminopropyltrimethoxysilane available from the company Momentive); then
Maintaining at 70° C. under nitrogen for approximately 1 hour until the NCO functions totally disappear.

The polymer Ex6-18 is prepared according to the following procedure:
Introducing 82.03 g of polyol ACCLAIM® 6300 (available from Bayer) into a glass synthesis apparatus, under a nitrogen atmosphere and under vacuum, heated to approximately 85-90° C.; then
Introducing 0.04 g of catalyst BORCHI KAT® VP 0244 (bismuth/zinc neodecanoate available from Société Borchers); then
Maintaining the apparatus for approximately 1 hour under vacuum at 85-90° C.; then
Introducing 9.45 g of isophorone diisocyanate;
Maintaining at 85-90° C. under nitrogen for approximately 2 hours until a level of NCO functions between 1.8 and 2.2% is obtained (level measured by assaying a sample); then
Cooling the apparatus to 65-70° C.; then
Introducing 7.98 g of 3-aminopropylmethyl-diethoxysilane; then
Maintaining at 70° C. under nitrogen for approximately 1 hour until the NCO functions totally disappear.

The polymer Ex20 is prepared according to the following procedure:
Introducing 84.71 g of polyol ACCLAIM® 8200 (available from Bayer) into a glass synthesis apparatus, under a nitrogen atmosphere and under vacuum, heated to approximately 85-90° C.; then
Introducing 0.04 g of catalyst BORCHI KAT® VP 0244; then
Maintaining the apparatus for approximately 1 hour under vacuum at 85-90° C.; then
Introducing 6.5 g of isophorone diisocyanate;
Maintaining at 85-90° C. under nitrogen for approximately 2 hours until a level of NCO functions between 1.7 and 2.2% is obtained (level measured by assaying a sample); then
Cooling the apparatus to 65-70° C.; then
Introducing 8.23 g of N ethyl-3-trimethoxysilyl-2-methylpropanamine then,
Maintaining at 70° C. under nitrogen for approximately 1 hour until the NCO functions totally disappear.

The polymer ExC6 is prepared according to the following procedure:
Introducing 80.3 g of polyol ACCLAIM® 8200 (available from Bayer) into a glass synthesis apparatus, under a nitrogen atmosphere and under vacuum, heated to approximately 85-90° C.; then
Introducing 0.07 g of catalyst BORCHI KAT® VP 0244; then
Maintaining the apparatus for approximately 1 hour under vacuum at 85-90° C.; then
Introducing 8.1 g of isophorone diisocyanate;
Maintaining at 85-90° C. under nitrogen for approximately 2 hours until a level of NCO functions between 1.7 and 2.2% is obtained (rate measured by sampling assay); then
Cooling the apparatus to 65-70° C.; then
Introducing 11.2 g of N ethyl-3-trimethoxysilyl-2-methylpropanamine then,
Maintaining at 70° C. under nitrogen for approximately 1 hour until the NCO functions totally disappear.

The following products were also used:
DERTOPHENE® H 150: tackifier resin of terpene phenolic type;
IRGANOX® 1010 and IRGANOX® 245: stabilizers;
K-KAT® 5218: cross-linking catalyst;

Vinylglycoxysilane: agent capable of absorbing water ("waterscavenger").

Tables 1 and 1a show the components of the adhesive compositions which were tested. The quantities of each constituent are given in percentage by mass.

Adhesive compositions C1, C2, C3, C4, C5 and C6 correspond to comparative adhesive compositions.

Compositions 6, 8, 15, 18, 19 and 20 correspond to adhesive compositions according to the invention.

TABLE 1 adhesive compositions (% by mass)

|  | C1 | C2 | C3 | C4 | C5 | C6 |
|---|---|---|---|---|---|---|
| GENIOSIL ® STPE15 |  |  | 51.10 |  | 38.90 |  |
| GENIOSIL ® STPE30 |  |  |  |  |  | 12.90 |
| Polyurethane A of WO2009/106699 | 51.70 |  |  | 41.00 |  |  |
| SPUR+ ® 1050MM |  | 51.70 |  |  |  |  |
| MS Polymer ® SAT 145 |  |  |  | 10.10 |  |  |
| Polymer Ex8 |  |  |  |  |  |  |
| Polymer Ex15 |  |  |  |  |  |  |
| Polymer Ex6-18 |  |  |  |  |  |  |
| Polymer Ex19 |  |  |  |  |  |  |
| Polymer ExC6 |  |  |  |  |  | 51.70 |
| DERTOPHENE ® H150 | 46.70 | 46.70 | 46.18 | 46.20 | 46.70 | 46.10 |
| IRGANOX ® 1010 | 0.47 | 0.47 | 0.47 | 0.45 | 0.45 | 0.45 |
| IRGANOX ® 245 | 0.25 | 0.25 | 0.25 | 0.25 | 0.25 | 0.25 |
| K-KAT ® 5218 | 0.50 | 0.50 | 2.00 | 2.00 | 1.00 | 2.00 |
| Vinylglycoxysilane | 0.38 | 0.38 |  |  |  |  |

TABLE 1a adhesive compositions (% by mass) (continued)

|  | 6 | 8 | 15 | 18 | 19 | 20 |
|---|---|---|---|---|---|---|
| GENIOSIL ® STPE15 |  |  |  |  |  |  |
| GENIOSIL ® STPE30 |  |  |  | 38.90 | 38.90 |  |
| Polyurethane A of WO2009/106699 |  |  | 45.90 |  |  |  |
| SPUR+ ® 1050MM |  |  |  |  |  |  |
| MS Polymer ® SAT 145 |  |  |  |  |  |  |
| Polymer Ex8 |  | 51.70 |  |  |  |  |
| Polymer Ex15 |  |  | 5.80 |  |  |  |
| Polymer Ex6-18 | 51.70 |  |  | 12.90 |  |  |
| Polymer Ex19 |  |  |  |  | 12.90 |  |
| Polymer Ex20 |  |  |  |  |  | 51.70 |
| DERTOPHENE ® H150 | 46.70 | 46.70 | 46.70 | 46.70 | 46.70 | 46.10 |
| IRGANOX ® 1010 | 0.45 | 0.47 | 0.45 | 0.45 | 0.45 | 0.45 |
| IRGANOX ® 245 | 0.25 | 0.25 | 0.25 | 0.25 | 0.25 | 0.25 |
| K-KAT ® 5218 | 1.00 | 0.50 | 1.00 | 1.00 | 1.00 | 2.00 |
| Vinylglycoxysilane |  | 0.38 |  |  |  |  |

The properties of the self-adhesive article according to the invention (with a support layer in the form of a foam) were assessed and compared with the properties of a comparative self-adhesive article (with a support layer made from PET).

The support layer in the form of a foam which was used for the tests is a foam TL SRZ® 1200.8 available from Alveo with the following characteristics:

An elongation at break in length at 23° C. of 408.3±53%,

An elongation at break in width at 23° C. of 390.3%,

A bulk density of approximately 96.92 kg/m$^3$,

A thickness of approximately 0.67 mm,

A Young's modulus of 11.2±0.5 MPa.

The support layer made from PET which was used for the tests has a thickness of 50 µm.

The compositions shown in Table 1 were applied onto the two support layers described above with a weight per unit area of approximately 50 g/m$^2$ in order to obtain a self-adhesive article.

Process for obtaining the self-adhesive articles tested:

Each adhesive composition is preheated to a temperature of approximately 100° C. and introduced into a cartridge, from which a bead is extruded then deposited close to the edge of the support layer, parallel to its width. The adhesive composition contained in this bead is then spread over the entire surface of a siliconized support (non-stick protective film or release liner), so as to obtain a uniform layer of substantially constant thickness, using an applicator ("coater") with a lipped nozzle which is moved from one side of the support layer to the opposite side. A layer of composition is thus deposited and corresponds to a weight per unit area of approximately 50 g/m$^2$ (thickness of approximately 50 µm). The support layer thus coated with the adhesive composition is then placed in an oven at a temperature of approximately 120° C. supplied with steam so that the quantity of water is approximately 50 g/m$^3$ with a homogeneous distribution. The residence time in the oven is approximately 5 minutes, allowing the adhesive composition to cross-link in order to obtain an adhesive layer. Finally, once removed from the oven, the cross-linked adhesive layer is then laminated on the desired support layer (foam Alveo® TLSRZ® 1200.8 or PET 50 µm support).

Static Shear Resistance Time of the Adhesive Joint:

Maintaining the tack of the support layer coated with the cross-linked composition at a high temperature is assessed at the latest in the 5 hours following its production by a test which determines the static shear resistance time of the adhesive joint at 90° C. on PET and at 70° C. on foam. For this test, reference is made to the FINAT No. 8 method. The principle is the following.

A sample in the form of a rectangular strip (25 mm×75 mm) is cut from the PET support layer or the foam support layer coated with the previously-prepared cross-linked composition, a maximum of 5 hours after its preparation. After removing the release liner in its entirety, a square portion having 25 mm sides situated at the end of the adhesive strip is fixed onto a glass plate.

The test plate thus obtained is introduced, by means of a suitable support, in a substantially vertical position into an oven at 90° C. for the article made with PET and 70° C. for the article made with foam, the non glued portion that has a length of 50 mm being situated below the plate. After thermal balancing, the portion of the strip that remains free is connected to a 1 kg weight, the whole of the device still throughout the duration of the test being kept in the oven at 90° C. and 70° C. respectively for the PET support and the foam support.

Under the effect of this weight, the adhesive joint which provides the attachment of the strip onto the plate undergoes a shear stress. For better control of this stress, the test plate is in fact placed so as to form an angle of 2° to the vertical.

A note is made of the time at the end of which the strip becomes detached from the plate following the breaking of the adhesive joint under the effect of this stress.

This time is indicated in Tables 2 and 2a.

TABLE 2 properties of the self-adhesive articles

|  | C1 | C2 | C3 | C4 | C5 | C6 |
|---|---|---|---|---|---|---|
| Support layer made of PET | | | | | | |
| Shear resistance at 90° C. | >24 h | >24 h | >24 h | >24 h | >24 h | >24 h |
| Support layer in the form of an Alveo TL SRZ ® 1200.8 foam | | | | | | |
| Shear resistance at 70° C. | 0.1 h | 0.2 h | 0.1 h | 1 h | 5 h | 1 h |

TABLE 2a properties of the self-adhesive articles (continued)

|  | 6 | 8 | 15 | 18 | 19 | 20 |
|---|---|---|---|---|---|---|
| Support layer made of PET | | | | | | |
| Shear resistance at 90° C. | >24 h | >24 h | >24 h | >24 h | >24 h | >24 h |
| Support layer in the form of an Alveo TL SRZ ® 1200.8 foam | | | | | | |
| Shear resistance at 70° C. | >24 h | >24 h | 12 h | >24 h | >24 h | >24 h |

Comparative examples C1, C2, C3, C4, C5 and C6 show that self-adhesive articles comprising an identical adhesive composition have properties that differ depending on the support layer used. In fact, these examples give good results with respect to the shear resistance with a PET support (resistance greater than 24 h), but these comparative examples do not give satisfactory shear resistance results with a support in the form of a foam (resistance comprising 0.1 h, 0.2 h, 1 h or 5 h).

These tests show that none of the adhesive compositions of the prior which have satisfactory properties on PET supports have satisfactory properties on conformable supports of foam type, such as claimed.

In contrast, Example 8 according to the invention, in which the adhesive composition comprises a single polymer corresponding to formula (IIa), gives good results with a support in the form of a foam.

Similarly, Example 18 in which the adhesive composition comprises a polymer of formula (IIa) and a polymer of formula (II) gives good results with a support in the form of a foam.

Example 20 comprises a polymer of formula (Ia) with a quantity of silyl functions of 0.372 meq/g in the claimed range and shows good results with a support in the form of a foam.

In contrast, comparative example C6 comprises a polymer of formula (Ia) with a quantity of silyl functions of 0.500 meq/g, a content outside the claimed range. This example C6 does not give satisfactory shear resistance results with a support in the form of a foam.

Examples 15 and 19, in which the composition comprises the mixture of two polymers belonging to two different groups from P1, P2, P3 and P4, gives satisfactory results in terms of shear resistance.

Of course the present invention is not limited to the examples and embodiment described and shown, but is capable of numerous variants accessible to a person skilled in the art.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A self-adhesive article comprising a support layer coated with an adhesive layer, said support layer having an elongation at break ranging from 50 to 1200% and a bulk density ranging from 25 to 1200 kg/m³, said adhesive layer is obtained by cross-linking an adhesive composition comprising:
   a) at least one polymer of formula (Ia) or at least one polymer of formula (IIa)
   b) at least one tackifier resin, and
   c) at least one cross-linking catalyst;
   wherein:
   the polymer of formula (Ia) is a polyurethane or a polyether comprising two or three hydrolysable terminal groups of trialkoxysilane type, with a quantity of silyl functions less than or equal to 0.480 meq/g of polymer and corresponding to the following formula:

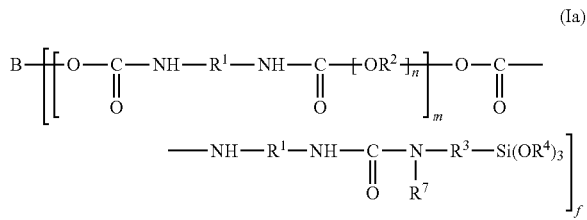

the polymer of formula (IIa) is a polyurethane or a polyether comprising two or three hydrolysable terminal groups of dialkoxysilane type, with a quantity of silyl functions less than or equal to 0.480 meq/g of polymer and corresponding to the following formula:

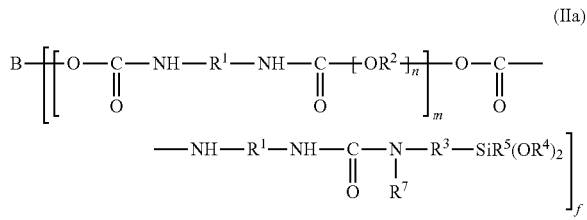

in formulae (Ia), (IIa) above,
B represents one of the two formulae below:

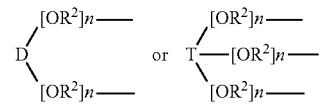

where D and T represent a hydrocarbon radical comprising 2 to 66 carbon atoms, linear, branched, cyclic, alicyclic or aromatic, saturated or unsaturated, optionally comprising one or more heteroatoms, R¹ represents a divalent hydrocarbon radical comprising 5 to 15 carbon atoms which is aromatic or aliphatic, linear, branched or cyclic, R³ represents a linear or branched divalent alkylene radical comprising 1 to 6 carbon atoms, R² represents a linear or branched divalent alkylene radical comprising 2 to 4 carbon atoms, R⁴ and R⁵, identical or different, each represent a linear or branched alkyl radical comprising 1 to 4 carbon atoms, R⁴ optionally being able to be part of a ring, R⁶ represents a hydrocarbon radical comprising 1 to 22 carbon atoms, linear, branched, cyclic, alicyclic or aromatic, saturated or unsaturated, optionally comprising one or more heteroatoms, R⁷ represents a hydrogen atom, a phenyl radical or a linear, branched or cyclic alkyl radical comprising 1 to 10 carbon atoms, n is an integer such that the average molar mass of the polyether block of formula —[OR²]$_n$— ranges from 300 g/mol to 40000 g/mol, m is an integer such that the average molar mass of the polymer ranges from 600 g/mole to 100000 g/mole, p is an integer equal to 0, 1 or 2 f is an integer equal to 2 or 3.

2. The self-adhesive article according to claim 1, wherein the support layer has a Young's modulus less than or equal to 300 MPa.

3. The self-adhesive article according to claim 1, wherein the support layer is in the form of a foam.

4. The self-adhesive article according to claim 1, wherein the support layer is presented in the form of one or more polymeric layers.

5. The self-adhesive article according to claim 1, wherein the adhesive composition comprises:

from 20 to 85% by weight, with respect to the total weight of the adhesive composition, of at least one polymer or a mixture of polymers, from 15 to 80% by weight, with respect to the total weight of the adhesive composition, of at least one tackifier resin, from 0.01 to 3% by weight, with respect to the total weight of the adhesive composition, of at least one cross-linking catalyst.

6. The self-adhesive article according to claim 1, wherein the tackifier resin has a number-average molar mass ranging from 100 Da to 5 kDa and is:

(i) resins able to be obtained by polymerization of terpene hydrocarbons and phenols, in the presence of Friedel-Crafts catalysts, (ii) resins able to be obtained by polymerization of alpha-methyl styrene, (i) rosins of natural or modified origin;

(iv) resins obtained by hydrogenation, polymerization or copolymerization of mixtures of unsaturated aliphatic hydrocarbons having approximately 5, 9 or 10 carbon atoms, originating from petroleum cuts, (v) terpene resins generally resulting from the polymerisation of terpene hydrocarbons in the presence of Friedel-Crafts catalysts, (vi) copolymers based on natural terpenes, or (vii) acrylic resins.

* * * * *